United States Patent [19]

Komakine et al.

[11] Patent Number: 5,550,619
[45] Date of Patent: Aug. 27, 1996

[54] ELECTROPHOTOGRAPHIC APPARATUS OF IMPROVED LOW IMAGE DENSITY

[75] Inventors: Hiroshi Komakine, Hirakata; Hiroshi Terada, Ikoma; Hajime Yamamoto, Ibaraki; Kazumasa Hayashi, Osaka; Masahiro Aizawa, Takatsuki, all of Japan

[73] Assignee: Matsushita Electric Industrial Co., Ltd., Kadoma, Japan

[21] Appl. No.: 179,590

[22] Filed: Jan. 10, 1994

[30] Foreign Application Priority Data

| Jan. 13, 1993 | [JP] | Japan | 5-003779 |
| Feb. 3, 1993 | [JP] | Japan | 5-016110 |

[51] Int. Cl.⁶ ................................. G03G 13/00
[52] U.S. Cl. .................... 355/246; 118/657; 355/211
[58] Field of Search .................. 355/210, 211, 355/269, 270, 271, 246, 250, 251, 252, 253, 259, 265; 118/652, 657, 658, 656, 653; 430/100, 102

[56] References Cited

U.S. PATENT DOCUMENTS

| 3,890,929 | 6/1975 | Walkup. | |
| 4,018,187 | 4/1977 | Abbott et al. | 118/658 |
| 4,597,661 | 7/1986 | Yamashita | 118/658 |
| 4,610,527 | 9/1986 | Cherbuy et al. | 118/657 |
| 4,769,676 | 9/1988 | Mukai et al. | 118/652 |
| 5,138,387 | 8/1992 | Sato et al. | 355/251 |
| 5,229,825 | 7/1993 | Yousey et al. | 355/253 X |
| 5,298,949 | 3/1994 | Yamamoto et al. | 355/246 |
| 5,488,465 | 1/1996 | Yamamoto et al. | 355/246 |

FOREIGN PATENT DOCUMENTS

| 509441A2 | 10/1992 | European Pat. Off. . |
| 48-22211 | 7/1973 | Japan . |
| 55-18657 | 2/1980 | Japan . |
| 55-105267 | 8/1980 | Japan . |
| 61-03153 | 1/1986 | Japan . |
| 1-239570 | 9/1989 | Japan . |
| 2-19877 | 1/1990 | Japan . |

*Primary Examiner*—Arthur T. Grimley
*Assistant Examiner*—Shuk Y. Lee
*Attorney, Agent, or Firm*—McDermott, Will & Emery

[57] ABSTRACT

An electrophotographic apparatus includes a photoconductor drum, also known as an electrostatic latent image holding member, with a magnet placed therein. An electrostatic latent image is formed on the magnetic drum. Then, the drum is brought into contact with a magnetic developer, or toner, in a developer reservoir to have the magnetic developer attached to the photoconductor drum surface by a magnetic force. A removing roller, having an AC voltage applied thereto, is passed in close vicinity of the magnetic drum with the resultant development of images because toner remains at image areas only. In the electrophotographic apparatus, the photoconductor drum, the removing roller or both include two magnetic poles. A device for increasing friction force of the surface of the photoconductor drum, of the removing roller or both may also be provided.

17 Claims, 14 Drawing Sheets

ELECTROPHOTOGRAPHIC APPARATUS OF IMPROVED LOW IMAGE DENSITY

BACKGROUND OF THE INVENTION

1. Field of the Invention

The present invention relates to an electrophotographic apparatus which can be used in printers, facsimile equipment or similar equipment.

2. Discussion of Related Art

A two-component development method using a developer formed of a toner and a carrier has so far been widely used in electrophotography, but in recent years development of a mono-component development method has been in progress in order to make image forming units smaller and less costly.

FIG. 28 shows the electrophotographic apparatus which uses such a mono-component development method, which was disclosed by the inventors of the present invention in the Japanese Patent Application "Heisei 3-345990." In FIG. 28, an electrostatic latent image holding member of an organic photoconductor drum 1 has phthalocyanine dispersed in a binder resin of polyester group. A magnet 2 has the axis thereof fixed coaxially with the organic photoconductor drum 1. A corona charger 3 charges the organic photoconductor drum 1. A grid electrode 4 controls charge potential of the organic photoconductor drum 1. The electrophotographic apparatus also includes a signal light 5 (also referred to herein as "laser light"), and a developer reservoir 6. A magnetic one-component toner 7 (also referred to in this application as a "one component magnetic toner" or as "toner") serves as a developer. A damper 8 makes smooth the flow of the toner 7 inside the developer reservoir 6, and also prevents the toner 7 from being packed due to its own weight and filling between the organic photoconductor drum 1 and a removing roller 9.

The magnet 2 forms a magnetic pole in an area of $\theta=10°$ opposite to the developer reservoir 6. The removing roller 9 is made of aluminum and has a magnet 10 therein. An AC high voltage power source 11 applies a voltage to the removing roller 9. A scraper 12 made of polyester film scrapes the toner from the removing roller 9. A transfer corona charger 13 transfers toner images formed on the organic photoconductor drum 1 to paper.

With the help of FIG. 28, an explanation will be made hereunder of how the electrophotographic apparatus described above operates. The organic photoconductor drum 1 is charged to −500 V by means of the corona charger 3 and the grid electrode 4. An electrostatic latent image is formed by irradiating the laser light 5 on the organic photoconductor drum 1. The toner 7 is deposited on the surface of the organic photoconductor drum 1 by magnetic force in the developer reservoir 6. Next, the organic photoconductor drum 1 is caused to pass the front of the removing roller 9. At this time, an AC voltage of $750_{o-p}$ (1 kHz in frequency) with a DC voltage of −350 V superimposed thereon is applied to the removing roller 9 from the AC high voltage power source 11. Then, the toner 7 is removed from the organic photoconductor drum 1 to the removing roller 9, and toner images with a positive-negative picture reversal are left only on the image areas of the organic photoconductor drum 1. The toner 7 deposited on the removing roller 9, which is rotating in the direction of the arrow, is scraped off by the scraper 12, and returned to the developer reservoir 6 for use in the image forming steps to follow. The toner images thus formed on the organic photoconductor drum 1 are transferred to paper (not shown in FIG. 28) by the transfer corona charger 13, and then thermally fixed by means of a fixing equipment (not shown in FIG. 28).

However, when printing is performed by the electrophotographic apparatus, the image density of solid-image is low under a high temperature and high humidity environment (33° C., 85% relative humidity (RH), for example), and background development is found to increase gradually on the printed images.

None of the prior art electrophotographic apparatus produces high quality images having high image density, which are substantially free of non-uniformity in density. Similarly, most of the prior art electrophotographic apparatus exhibits unevenness in the force transporting the toner particles on the electrostatic image holding member.

SUMMARY OF THE INVENTION

One object of the present invention is to provide an electrophotographic apparatus for reproducing prints with high image density and excellent image quality which does not show any non-uniformity in image density and any background development.

One embodiment of the present invention is directed to an electrophotographic apparatus comprising a magnetic developer, an electrostatic latent image holding member which rotates in a specified direction, and a removing roller which is placed at a position with a specified distance apart from the surface of said electrostatic latent image holding member and rotates in the direction opposite to the rotation of said electrostatic latent image holding member, a developer reservoir for supplying said magnetic developer to the surface of said electrostatic latent image holding member, a means for supplying an AC voltage to said removing roller to remove the developer retained on non-image areas of said electrostatic latent image holding member, and a magnetic field generating means, installed inside said electrostatic latent image holding member, for producing two magnetic poles having polarity different from each other on the surface of said electrostatic latent image holding member in the proximity to (also referred to interchangably in this application as "the vicinity of") image developing areas where said electrostatic latent image holding member comes closest to said removing roller.

Thus, the invention makes it possible to realize an electrophotographic apparatus wherein the developer, e.g., the toner, attached on the electrostatic latent image holding member, is transported in abundance to the image development areas where the electrostatic latent image holding member and the removing roller are situated opposite to each other, resulting in an improvement in low image density (caused in prior art by insufficient supply of toner) and an achievement in gaining a high resolution picture of excellent quality in a stable manner even under the conditions of high temperature and high humidity, and further an achievement in realizing a picture of excellent quality even when operated under a high speed processing condition.

Another embodiment of the present invention is directed to an electrophotographic apparatus comprising a magnetic developer, an electrostatic latent image holding member which rotates in a specified direction, a removing roller which is placed at position with a specified distance apart from the surface of said electrostatic latent image holding member and rotates in the direction opposite to the rotation of said electrostatic latent image holding member, a developer reservoir for supplying said magnetic developer to the surface of said electrostatic latent image holding member, a means for supplying an AC voltage to said removing roller to remove the developer retained on non-image areas of said electrostatic latent image holding member, and a magnetic field generating means installed inside said removing roller, for producing two magnetic poles with polarity different from each other on the surface of said removing roller in the vicinity of image development areas where said electrostatic latent image holding member comes closest to said removing roller.

Thus, the invention makes it possible to realize an electrophotographic apparatus wherein the toner collected on the removing roller is quickly removed from the image developing areas with the resultant prevention of background developing caused by insufficient removal of the toner, consequently contributing to gaining a high resolution picture of excellent quality in a stabilized manner even under the conditions of high temperature and high humidity, and further realizing a picture of excellent quality even when operated under a high speed processing condition.

Yet another embodiment of the present invention is directed to an electrophotographic apparatus comprising a magnetic developer, an electrostatic latent image holding member rotating in a specified direction, a removing roller which is placed at a position with a specified distance apart from the surface of said electrostatic latent image holding member and rotates in the direction opposite to the rotation of said electrostatic latent image holding member, a developer reservoir for supplying said magnetic developer to the surface of said electrostatic latent image holding member, a means for supplying an AC voltage to said removing roller to remove the developer retained on non-image areas of said electrostatic latent image holding member, and a magnetic field generating means, installed inside said electrostatic latent image holding member, for producing two magnetic poles, having different polarity from each other, on the surface of said electrostatic latent image holding member in the vicinity of image developing areas where said electrostatic latent image holding member comes closest to said removing roller, and a magnetic field generating means installed inside said removing roller for producing two magnetic poles having polarity different from each other on the surface of said removing roller in the vicinity of developing areas where said electrostatic latent image holding member comes closest to said removing roller.

Yet another embodiment of the present invention is directed to an electrophotographic apparatus comprising a magnetic developer, an electrostatic latent image holding member which has on its surface a means for increasing friction force against said developer and rotates in a specified direction, a removing roller which is placed at a position with a specified distance apart from the surface of said electrostatic latent image holding member and rotates in the direction opposite to the rotation of said electrostatic latent image holding member, a developer reservoir for supplying said magnetic developer to the surface of said electrostatic latent image holding member, a means for supplying an AC voltage to said removing roller to remove the developer retained on non-image areas of said electrostatic latent image holding member, and a magnetic field generating means, installed inside said electrostatic latent image holding member, for producing a magnetic field on the surface of said electrostatic latent image holding member in the vicinity of image developing areas where said electrostatic latent image holding member comes closest to said removing roller.

Thus, the invention makes it possible to realize an electrophotographic apparatus wherein the quantity of the toner to be deposited on the electrostatic latent image holding member is sufficiently secured with a resultant contribution to gaining a high resolution picture of excellent quality in a stabilized manner even under the conditions of high temperature and high humidity, and further realizing a picture of excellent quality even when operated under a high speed processing condition.

Still another embodiment of the present invention is an electrophotographic apparatus comprising a magnetic developer, an electrostatic latent image holding member which rotates in a specified direction, a removing roller which has on its surface a means for increasing friction force against said developer, and which is placed at a position with a specified distance apart from the surface of said electrostatic latent image holding member, and rotates in the direction opposite to the rotation of said electrostatic latent image holding member, a developer reservoir for supplying said magnetic developer to the surface of said electrostatic latent image holding member, a means for supplying an AC voltage to said removing roller for removing the developer retained on non-image areas of said electrostatic latent image holding member, and a magnetic field generating means, installed inside said electrostatic latent image holding member, for producing a magnetic field on the surface of said electrostatic latent image holding member in the vicinity of image developing areas where said electrostatic latent image holding member comes closest to said removing roller.

Thus, the invention makes it possible to realize an electrophotographic apparatus wherein the toner collected on the removing roller is quickly removed from the image development areas with resultant prevention of background developing caused by insufficient collection of the toner, consequently contributing to gaining a high resolution picture of excellent quality in a stabilized manner even under the conditions of high temperature and high humidity, and further realizing a picture of excellent quality even when operated under a high speed processing condition.

Another embodiment of the invention is directed to a method for forming an image by an electrophotographic apparatus comprising: forming an electrostatic latent image on a surface of an electrostatic latent image holding member; applying a magnetic developer to the surface of the electrostatic latent image holding member, thereby applying the magnetic developer to image and non-image areas of the surface of the electrostatic image holding member; attaching the magnetic developer to the surface of the electrostatic latent image holding member by a first magnetic field generating means installed inside the electrostatic latent image holding member, said magnetic field generating means producing two magnetic poles, having polarity different from each other, on the surface of the electrostatic latent image holding member; passing a removing roller, comprising a second magnetic field generating means installed therein, in the vicinity of the electrostatic latent image holding member to remove the magnetic developer from the non-image areas of the electrostatic latent image holding member; and transferring onto paper the magnetic developer from the image areas.

Yet another embodiment of the invention is directed to an electrophotographic apparatus comprising a magnetic developer, an electrostatic latent image holding member rotating in a specified direction, a removing roller placed at a position with a specified distance apart from the surface of said electrostatic latent image holding member rotating opposite to said specified direction, a developer reservoir for supplying said magnetic developer to the surface of said electrostatic latent image holding member, a voltage source for applying an AC voltage to said removing roller to remove the magnetic developer retained on non-image areas of said electrostatic latent image holding member, and a magnetic field generator installed inside said electrostatic latent image holding member for producing two magnetic poles having polarity different from each other on the surface of said electrostatic latent image holding member in proximity to developing areas where said electrostatic latent image holding member comes closest to said removing roller.

The electrophotographic apparatus of the invention has a number of advantages. The electrophotographic apparatus of the invention produces high quality images having high image density, which are substantially free of non-uniformity in density. The apparatus substantially eliminates the unevenness in the force transporting the toner particles on the electrostatic image holding member because the force is applied to a magnetic brush of the particles formed on the surface of the electrostatic image holding member, rather than to the individual particles. Without wishing to be bound by any theory of operability, it is believed that this feature of the apparatus contributes to the improved quality of images produced thereby.

DETAILED DESCRIPTION OF PREFERRED EMBODIMENTS

The invention will be described in conjunction with exemplary embodiments thereof illustrated in the figures and the following examples.

EXAMPLE 1

An electrophotographic apparatus of the first exemplary embodiment of the present invention will be described with the help of FIG. 1 to FIG. 5.

Figure 1:
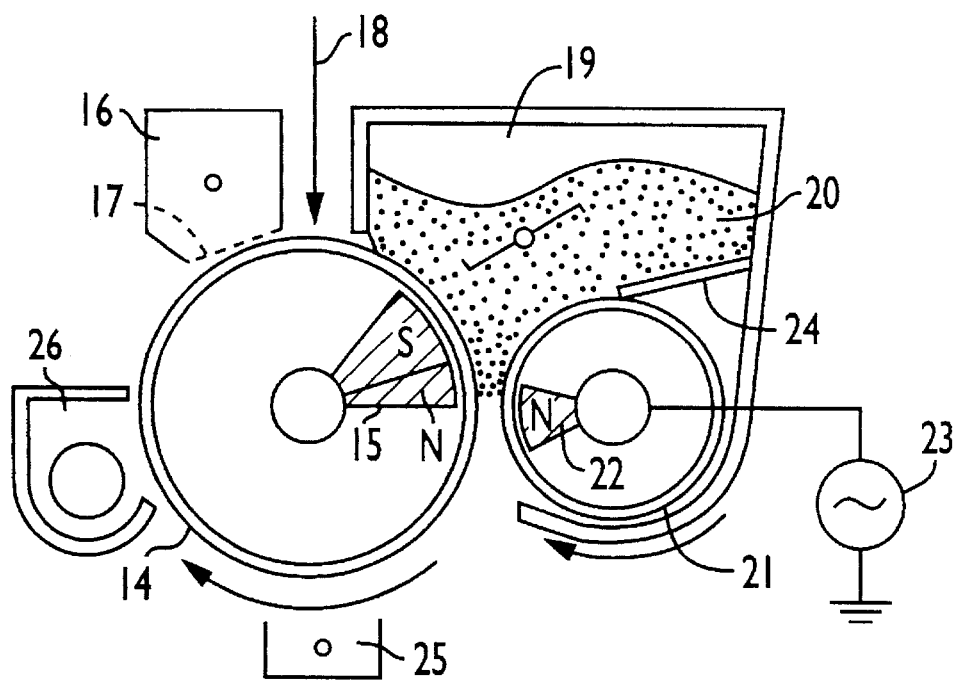
FIG. 1 is a schematic illustration showing the structure of a first exemplary embodiment of the present invention of an electrophotographic apparatus.

FIG. 1 is a schematic illustration showing the structure of Example 1 of the invention.

With reference to FIG. 1, a cylindrical electrostatic latent image holding member 14 (30 mm in diameter), also referred to in this application as an "electrostatic latent image holding member" has disposed on its surface an organic photoconductor prepared by dispersing phthalocyanine in a binder resin of polyester group. The electrostatic latent image holding member 14 rotates at a peripheral speed of 30 mm/s. A magnet 15 is fixed coaxially with said electrostatic latent image holding member 14. The magnet 15 is formed of non-rotary two poles, and it serves as a magnetic field generating means. The magnet 15 of this embodiment and any equivalent magnets or magnetic plates of all embodiments of the invention are stationary and do not rotate with the cylindrical electrostatic latent image holding member 14. Accordingly, the magnet 15 (and its equivalents, such as magnetic plates) may also be referred to herein as "non-rotary magnet" or "non-rotary magnetic plate." There are no particular restrictions imposed on the nature of the magnet 15 which can be any suitable magnet, such as a permanent magnet or an electromagnet.

A corona charger 16 charges negatively the electrostatic latent image holding member 14. A grid electrode 17 controls the charge potential of the electrostatic latent image holding member 14. A signal light 18 forms electrostatic latent images. The electrophotographic apparatus also includes a developer reservoir 19 and a developer 20, e.g., a magnetic mono-component negatively chargeable toner with an average particle diameter of 12 μm. A cylindrical removing roller 21 (16 mm in diameter), made of aluminum, serves as an electrode, which is installed at a specified distance apart from the electrostatic latent image holding member 14. The removing roller 21 rotates at a peripheral speed of 30 mm/s in the direction opposite to the rotation of the electrostatic latent image holding member 14. A non-rotary magnet 22 is fixed coaxially with the removing roller 21. The non-rotary magnet 22 serves as a magnetic field generating means. The magnet 22 of this embodiment and any equivalent magnets or magnetic plates of all embodiments of the invention are stationary and do not rotate with the removing roller 21. Accordingly, the magnet 22 (and its equivalents, such as magnetic plates) may also be referred to herein as "non-rotary magnet" or "non-rotary magnetic plate." There are no specific restrictions imposed on the nature of the magnet 22, which can be any suitable magnet, such as a permanent magnet or an electromagnet.

An AC high voltage power source 23 applies voltage to the removing roller 21. A scraper 24 made, for example, of a polyester film, scrapes off the toner attached on the removing roller 21. A transfer corona charger 25 transfers the images, which are formed on the electrostatic latent image holding member 14 by deposition of the toner, onto paper. A cleaner 26 removes the toner that remains on the electrostatic latent image holding member 14 after the images are transferred.

Figure 3:
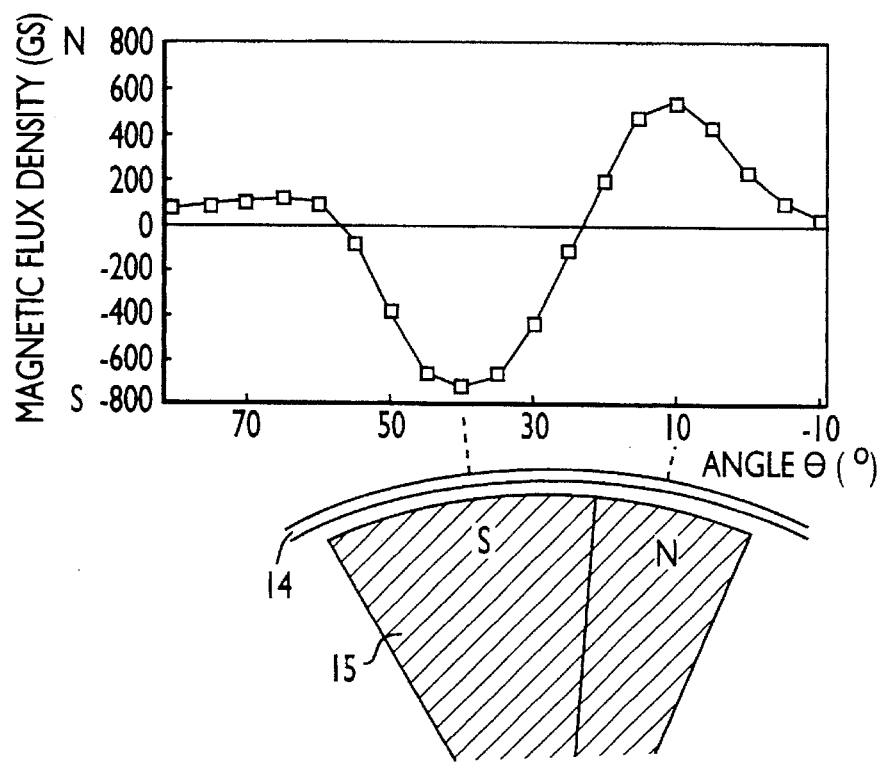
FIG. 3 is a chart of the magnetic flux density distribution observed in the vertical direction on the surface of the electrostatic latent image holding members of the first, fifth, and sixth exemplary embodiments of the present invention, respectively.

FIG. 3 shows a chart of magnetic flux density distribution observed in the vertical direction on the surface of the electrostatic latent image holding member 14 in the vicinity of the magnet 15. The peak values of the magnetic flux density measure −700 Gs (S-pole), and 500 Gs (N-pole), respectively. The peak value of magnetic flux density of the magnet 22 measures 600 Gs (N-pole) at the surface of the removing roller 21.

Figure 4:
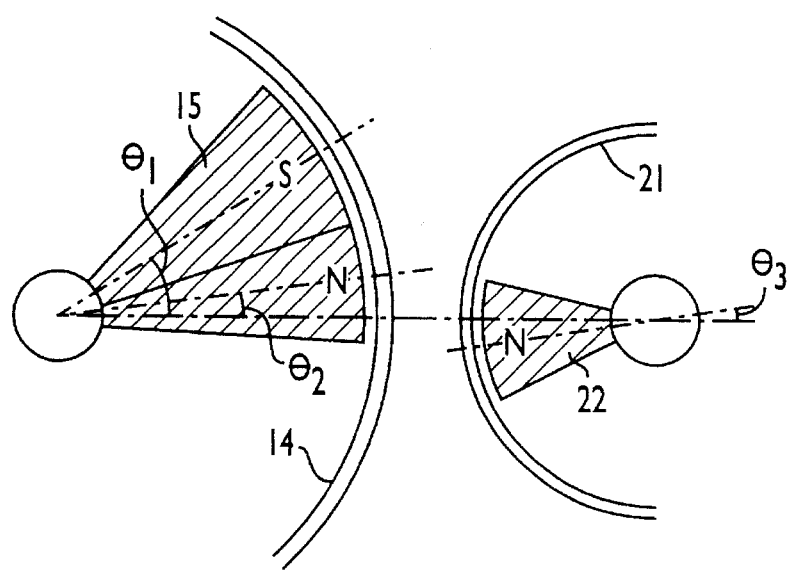
FIG. 4 is a schematic illustration for explaining the arrangement of the magnetic poles formed by magnets as described in the first exemplary embodiment of the present invention.

FIG. 4 shows the positional relation between the magnets 15 and 22, both installed inside the electrostatic latent image holding member 14 and the removing roller 21, respectively.

The angle $\theta_1$ that the south pole of the magnet 15 installed inside the electrostatic latent image holding member 14 makes from the point where the surface of the electrostatic latent image holding member 14 comes closest to that of the removing roller 21 was set in one embodiment to $\theta_1=40°$ in the direction opposite to the rotation of the electrostatic latent image holding member 14, while the angle $\theta_2$ of the north pole was set to $\theta_2=10°$ in the same embodiment.

In that same embodiment, the angle $\theta_3$ that the north pole of the magnet 22, installed inside the removing roller 21, makes from the point where the surface of the removing roller 21 comes closest to that of the electrostatic latent image holding member 14 was set to $\theta_3=-15°$ in the direction opposite to the rotation of the removing roller 21.

In general, the range of the angle $\theta_1$ is desirable to be $15°<\theta_1<50°$, and the range of $20°<\theta_1<45°$, in particular, is the most suitable range.

The range of the angle $\theta_2$ is desirable to be $0°<\theta_2<30°$, and the range of $5°<\theta_2<20°$, in particular, is the post suitable range.

The range of the angle $\theta_3$ is desirable to be $-30°<\theta_3<10°$, and the range of $-20°<\theta_3<0°$, in particular, is the most suitable range.

The composition of the developer used in the present example, i.e., the one component magnetic toner, was 70% wt. of polyester resin, 25% wt. of ferrite, 3% wt. of carbon black, and 2% wt. of oxycarboxylic acid metal complex with 0.4% wt. of colloidal silica added further.

The operation of the electrophotographic apparatus constructed as described above will be explained hereunder with reference to FIG. 1.

The electrostatic latent image holding member 14 was charged to −500 V by means of the corona charger 16 and the grid electrode 17. (The applied voltage was −4 kV and the grid electrode voltage was −500 V.). Then, an electrostatic latent image was formed by irradiation of the laser signal light 18 on the electrostatic latent image holding member 14.

At this time, the exposure potential ($V_r$) of the electrostatic latent image holding member 14 was −100 V. Next, the one-component magnetic toner was attached on the surface of the electrostatic latent image holding member 14 in the developer reservoir 19 by the magnetic force of the magnet 15.

At this time, the toner was charged to about −3 μC/g. The toner attached on the electrostatic latent image holding member 14 was then formed into a brush-like shape along the magnetic force which was produced by the magnet 15 and disposed in the peripheral direction of the electrostatic latent image holding member 14. The toner attached in the brush-like shape was transported by the frictional force caused by rotation of the electrostatic latent image holding member 14. Thus, the magnetic toner which was aligned along the magnetic force lines produced by magnetic field looked like a brush, and is referred to as a "magnetic brush." The electrostatic latent image holding member 14 having a toner layer attached thereto passed the front of the removing roller 21, the surface of which was located at a distance of 300 μm from that of the electrostatic latent image holding member 14.

Figure 5:
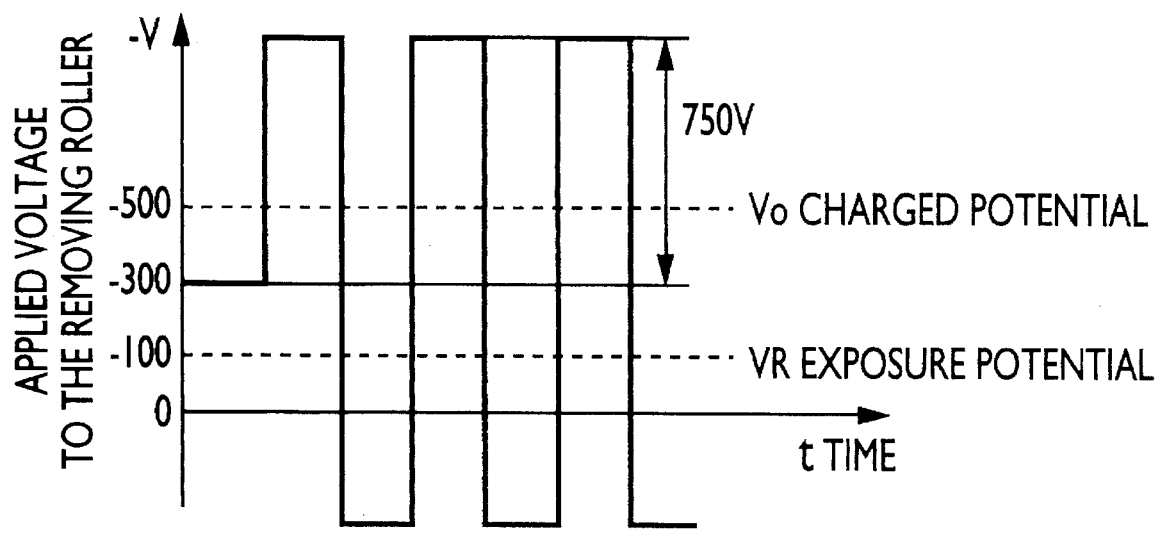
FIG. 5 shows waveforms of the AC voltage as used in the first, second, third, fourth, fifth, sixth, seventh, eighth, and ninth exemplary embodiments of the present invention, respectively.

An AC voltage (1 kHz in frequency) of 750 $V_{o-p}$ superimposed with a DC voltage of −300 V having a waveform as shown in FIG. 5 was applied to the removing roller 21 from the AC high voltage power source 23. While the toner layer on the electrostatic latent image holding member 14 was traveling by passing between the electrostatic latent image holding member 14 and the removing roller 21, the toner attached to the non-image areas of the electrostatic latent image holding member 14 was gradually removed to the side of the removing roller 21. Only the toner images with a positive-negative picture reversal remained at the image areas of the electrostatic latent image holding member 14.

The toner attached on the removing roller 21 was formed into a brush-like shape along the magnetic force which was produced by the magnet 22 and disposed in the peripheral direction of the removing roller. The toner attached on the removing roller 21 was transported by the frictional force caused by rotation of the removing roller 21, in the direction indicated by an arrow in FIG. 1, scraped off by the scraper 24, and returned into the developer reservoir 19. It was observed at the upper area of the S-pole on the surface of the electrostatic latent image holding member 14 that the toner was in a fierce turbulence. The toner images thus formed on the electrostatic latent image holding member 14 were transferred onto paper (not shown in FIG. 1) by means of the transfer corona charger 25. Then, after thermal fixing by means of a fixing equipment (not shown in FIG. 1), printed images were obtained. On the other hand, the toner left on the electrostatic latent image holding member 14, after transferring the toner images onto paper, was transported by the rotation of the electrostatic latent image holding member 14, and collected by the cleaner 26. As a result, sharp images of high image density without showing any non-uniformity of density were obtained.

Accordingly, this particular exemplary embodiment of the present invention features a structure comprising a fixed and non-rotary magnet, i.e., a magnetic field generating means, which is installed inside a rotary electrostatic latent image holding member, and produces two magnetic poles having polarity opposite to each other on the surface of the electrostatic latent image holding member in the vicinity of the developing areas where the electrostatic latent image holding member comes closest to the removing roller.

Figure 2:
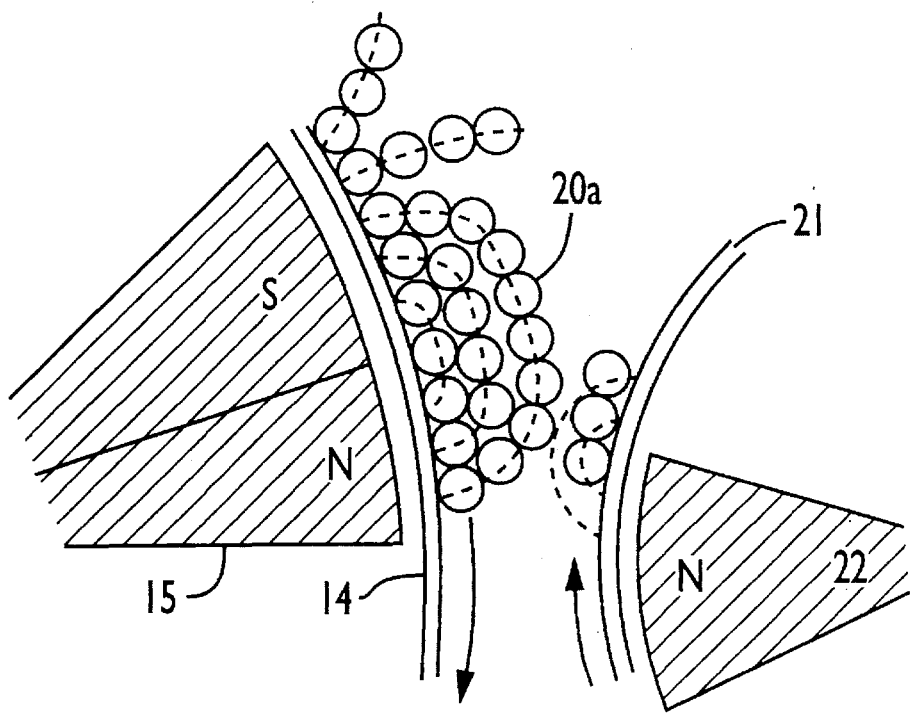
FIG. 2 is an enlarged view of the vicinity of the developing areas shown in FIG. 1 for explaining the effects of the present invention.

The operation of the electrophotographic apparatus of the present example and the effects thereof will be explained in a greater detail with reference to FIG. 2. FIG. 2 is an enlarged view showing schematically the vicinity of the developing areas of the electrophotographic apparatus illustrated in FIG. 1. As shown in FIG. 2, the toner is aligned in a brush-like shape along the magnetic force lines generated by the magnet 15 in the peripheral direction of the electrostatic latent image holding member 14 to form a magnetic brush 20a. Therefore, the transporting force applied to the toner 20 (or "developer 20") exerted by the electrostatic latent image holding member 14 does not work on the individual particles of the toner, which are forming the first layer of the toner and are in direct contact with the surface of the electrostatic latent image holding member. Instead, the transporting force applied to the toner 20 works on the entire magnetic brush which is a collection of the toner particles arranged together by the magnetic force, and therefore the transporting force to carry the toner is remarkably intensified. Besides, the unevenness in transporting force due to the non-uniformity in frictional force among the individual toner particles is also rectified. As a result, the toner furnished to the electrostatic latent image holding member 14 is supplied to the developing areas in abundance and in a stabilized manner, thereby producing an excellent picture quality showing a high image density, which is substantially free of any non-uniformity in density.

EXAMPLE 2

A second exemplary embodiment of the present invention for an electrophotographic apparatus will be explained with reference to FIG. 6, FIG. 7, and FIG. 8.

Figure 6:
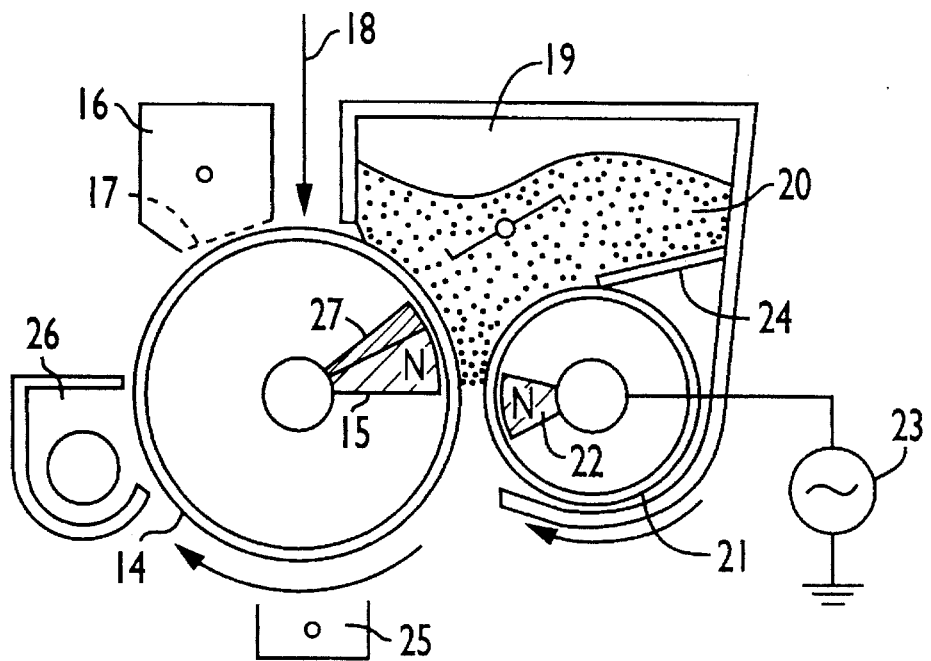
FIG. 6 is a schematic illustration showing the structure of a second exemplary embodiment of the present invention of an electrophotographic apparatus.

The present example is a modification of the previous exemplary embodiment, illustrated, e.g., in Example 1, and the structure thereof is illustrated in FIG. 6. The structure shown in FIG. 6 differs from that of FIG. 1 in the magnetic field generating means. More specifically, the magnet 15 installed inside the electrostatic latent image holding member has one magnetic pole, and a magnetic plate 27 has been added, instead, to the magnet 15 at the side opposite to the direction of rotation thereof. The magnetic plate 27 can be made of any substance readily magnetized by an external magnetic field, such as iron or similar substances. The remaining parts of FIG. 6 are the same as those in FIG. 1. Therefore, the function of the various components and the operation of the electrophotographic apparatus of FIG. 6 is substantially the same as those of FIG. 1, described in detail above.

Figure 7:
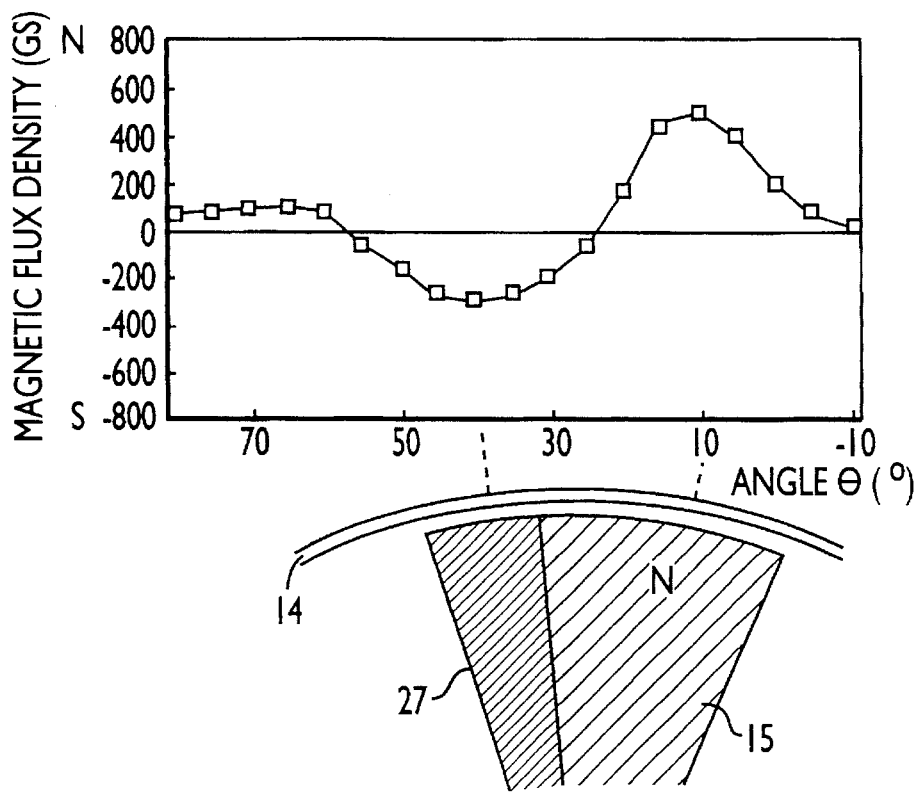
FIG. 7 is a chart of the magnetic flux density distribution observed in the vertical direction on the surface of the electrostatic latent image holding member of the second, and seventh exemplary embodiments of the present invention, respectively.
Figure 8:
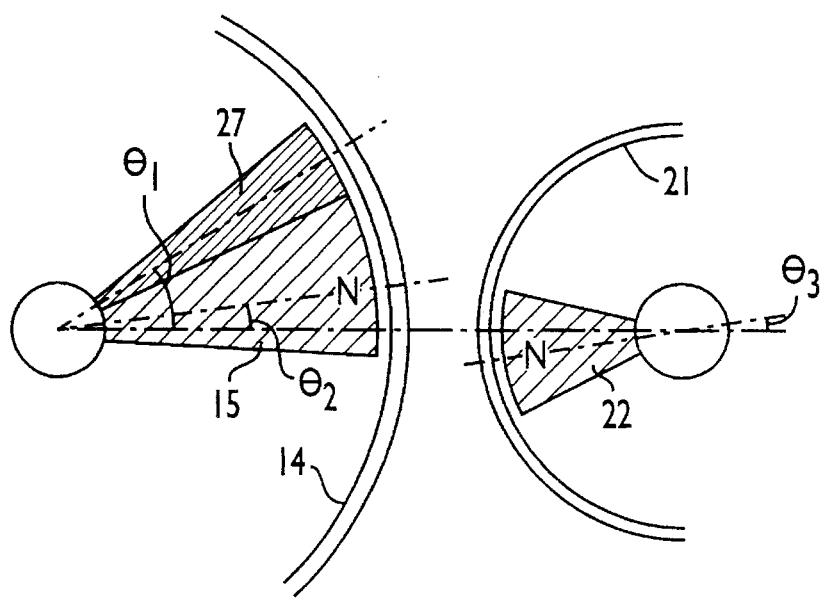
FIG. 8 is a schematic illustration for explaining the arrangement of the magnetic poles formed by magnets as described in a second exemplary embodiment of the present invention.

FIG. 7 shows a chart of the magnetic flux density distribution of the magnet 15 and the magnetic plate 27 observed in the vertical direction on the surface of the electrostatic latent image holding member 14 in this Example. The peak values of the magnetic flux density measured −300 Gs (magnetic plate), and 500 Gs (N-pole), respectively. The magnetic plate 27 is magnetized by the magnet 15, and a magnetic pole opposite to the one formed on the surface of the magnet 15 is produced on the surface of the magnetic plate 27. FIG. 8 shows the arrangement of the magnet 15 and the magnetic plate 27 both installed inside the electrostatic latent image holding member 14, and the magnet 22 inside the removing roller 21. The angle $\theta_1$ that the magnetic plate 27 installed inside the electrostatic latent image holding member 14 makes from the point where the surface of the electrostatic latent image holding member 14 comes closest to that of the removing roller 21 was set to $\theta_1=40°$ in the direction opposite to the rotation of the electrostatic latent image holding member 14, while the angle $\theta_2$ of the north pole of the magnet 15 inside the electrostatic latent image holding member 14 was set to $\theta_2=10°$. The angle $\theta_3$ that the north pole of the magnet 22 installed inside the removing roller 21 makes from the point where the surface of the removing roller 21 comes closest to that of the electrostatic latent image holding member 14 was set to $\theta_3=-15°$ in the direction opposite to the rotation of the removing roller 21.

The range of said angle $\theta_1$ is desirable to be $15°<\theta_1<50°$, and the range of $20°<\theta_1<45°$ in particular, is the most suitable range. The range of said angle $\theta_2$ is desirable to be $0°<\theta_2<30°$, and the range of $5°<\theta_2<20°$ in particular, is the most suitable range. The range of said angle $\theta_3$ is desirable to be $-30°<\theta_3<10°$, and the range of $-20°<\theta_3<0°$ in particular, is the most suitable range.

The operation of the electrophotographic apparatus constructed as described above will be explained hereunder with reference to FIG. 6.

The electrostatic latent image holding member 14 was charged to −500 V by means of the corona charger 16 and the grid electrode 17. (The applied voltage was −4 kV and the grid electrode voltage was −500 V.) Then, an electrostatic latent image was formed by irradiation of the laser signal light 18 on said electrostatic latent image holding member 14. At this time, the exposure potential ($V_r$) of the electrostatic latent image holding member 14 was −100 V. Next, the mono-component magnetic toner was attached on the surface of said electrostatic latent image holding member 14 in the developer reservoir 19 by the magnetic force of both the magnet 15 and the magnetic plate 27. The toner attached on the electrostatic latent image holding member 14 was then formed into a brush-like shape along the magnetic force, which was produced by both the magnet 15 and the magnetic plate 27, and disposed in the peripheral direction of the electrostatic latent image holding member 14. The toner attached in the brush-like shape was transported by the frictional force caused by rotation of the electrostatic latent image holding member 14. The electrostatic latent image holding member 14 with the toner layer attached passed the front of the removing roller 21, the surface of which was located at a distance of 300 μm from that of the electrostatic latent image holding member 14. An AC voltage (1 kHz in frequency) of 750 $V_{o-p}$, superimposed with a DC voltage of −300 V having a waveform as shown in FIG. 5, was applied to the removing roller 21 from the high voltage power source 23.

While the toner layer on the electrostatic latent image holding member 14 was traveling by passing between the electrostatic latent image holding member 14 and the removing roller 21, the toner attached on the non-image areas of the electrostatic latent image holding member 14 was gradually removed to the side of the removing roller 21. Only the toner images with a positive-negative picture reversal remained at the image areas of the electrostatic latent image holding member 14.

The toner attached on the removing roller 21 was formed into a brush-like shape along the magnetic force which was produced by the magnet 22 and disposed in the peripheral direction of the removing roller. The toner attached in the brush-like shape was transported by the frictional force caused by rotation of the removing roller 21, scraped off by the scraper 24, and returned into the developer reservoir 19. It was observed at the upper area of the magnetic plate 27, on the surface of the electrostatic latent image holding member 14, that the toner was in a fierce turbulence. The toner images thus formed on the electrostatic latent image holding member 14 were transferred onto paper (not shown in FIG. 6) by means of the transfer corona charger 25. Then, after thermally fixing by means of a fixing equipment (not shown in FIG. 6), printed images were obtained. On the other hand, the toner left on the electrostatic latent image holding member 14, after transferring the toner images to paper, was transported by the rotation of the electrostatic latent image holding member 14, and collected by the cleaner 26.

As a result, sharp images of high image density without showing any non-uniformity of density were obtained.

The remaining properties and features of the electrophotographic apparatus of this Example are the same as explained above in conjunction with the apparatus of Example 1.

EXAMPLE 3

An electrophotographic apparatus of a third exemplary embodiment of the this invention will be described with reference to FIGS. 9–12.

Figure 9:
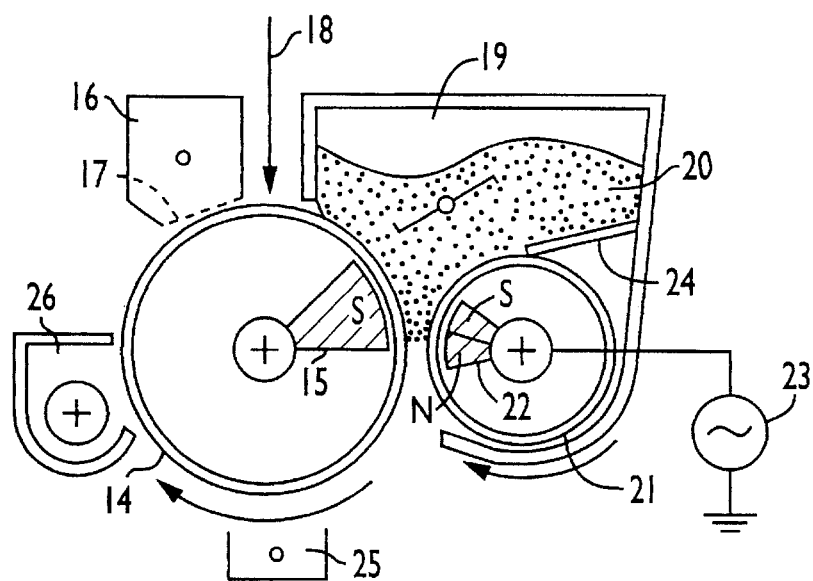
FIG. 9 is a schematic illustration to show the structure of a third exemplary embodiment of the present invention of an electrophotographic apparatus.

FIG. 9 is a schematic illustration showing the structure of another exemplary embodiment of the present invention of an electrophotographic apparatus of this invention. In FIG. 9, a cylindrical electrostatic latent image holding member 14 (30 mm in diameter), has its surface disposed with an organic photoconductor prepared by dispersing phthalocyanine in a binder resin of polyester group, and rotates at a peripheral speed of 30 mm/s. A non-rotary magnet 15 is fixed coaxially with said electrostatic latent image holding member 14. The magnet 15 can be any suitable magnet, such as a permanent magnet or an electromagnet. The peak value of the magnetic flux density on the surface of the electrostatic latent image holding member 14 is −800 Gs (S-pole). A corona charger 16 charges negatively the electrostatic latent image holding member 14. A grid electrode 17 controls the charge potential of the electrostatic latent image holding member 14. A signal light 18 (also referred to herein as a "laser light" or a "laser signal light") forms electrostatic latent images. The electrophotographic apparatus of this embodiment also comprises a developer reservoir 19, a developer 20, e.g., a magnetic mono-component negatively chargeable toner with an average particle diameter of 12 μm, and a cylindrical removing roller 21 (also referred to herein as a "removing roller") (16 mm in diameter), made of aluminum, serving as an electrode and rotating at a peripheral speed of 30 mm/s in the direction opposite to the rotation of the electrostatic latent image holding member 14. A non-rotary magnet 22 is fixed coaxially with the removing roller 21 and formed of two magnetic poles. The magnet 22 can be any suitable magnet, such as a permanent magnet or an electromagnet. An AC high voltage power source 23 applies voltage to the removing roller 21. A scraper 24, made of polyester film, scrapes off the toner attached on the removing roller 21. A transfer corona charger 25 transfers the images, which were formed on the electrostatic latent image holding member 14 by deposition of toner, onto paper. A cleaner 26 removes the toner that remains on the electrostatic latent image holding member 14 after transferring the images.

Figure 11:
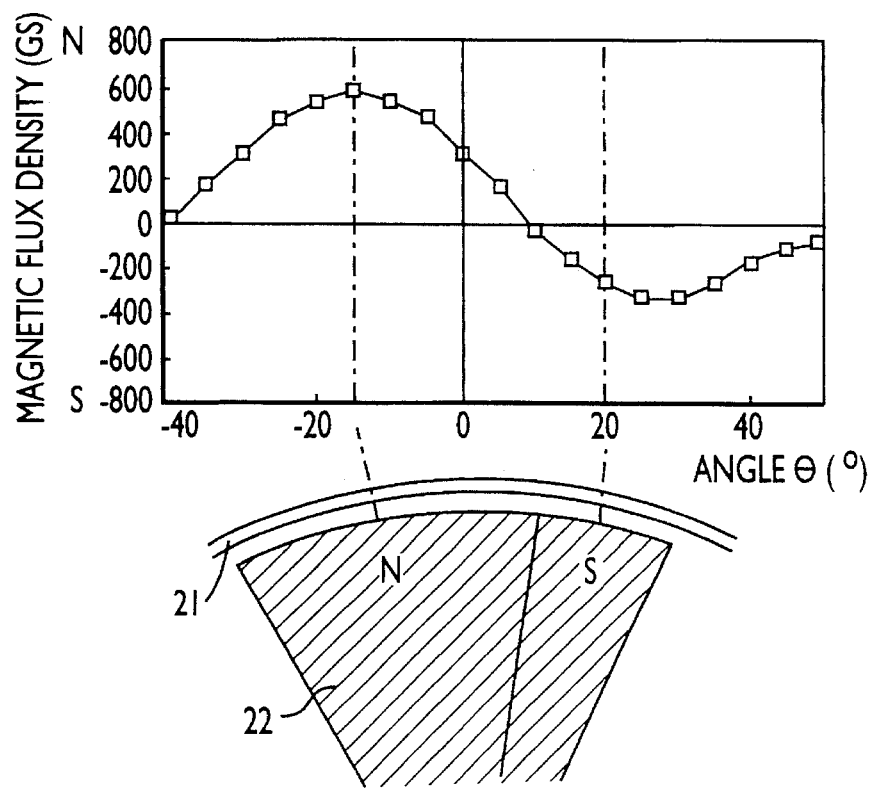
FIG. 11 is a chart of the magnetic flux density distribution observed in the vertical direction on the surface of the removing rollers of the third, fifth, and seventh exemplary embodiments of the present invention, respectively.
Figure 12:
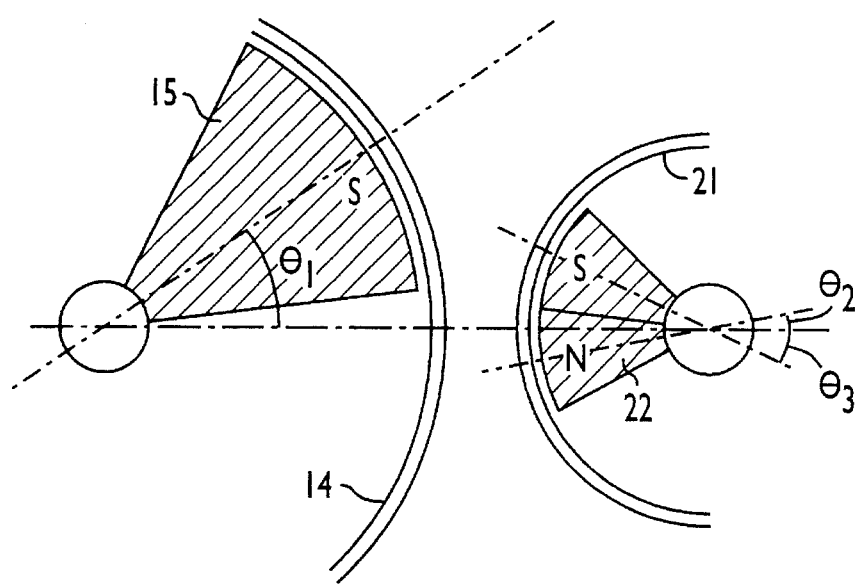
FIG. 12 is a schematic illustration for explaining the arrangement of the magnetic poles formed by magnets as described in a third exemplary embodiment of the present invention.

FIG. 11 is a chart of the magnetic flux density distribution observed on the surface of the removing roller 21 in the vertical direction of the magnet 22. The peak values of the magnetic flux density measure −600 Gs (N-pole), and −350 Gs (S-pole), respectively. FIG. 12 shows the positional relation between the magnets 15 and 22 both installed inside the electrostatic latent image holding member 14 and the removing roller 21, respectively. The angle $\theta_1$ that the magnet 15, installed inside the electrostatic latent image holding member 14, makes from the point where the surface of the electrostatic latent image holding member 14 comes closest to that of the removing roller 21 was set to $\theta_1=35°$ in the direction opposite to the rotation of the electrostatic latent image holding member 14, while the angle $\theta_2$ of the north pole of the magnet 22 inside the removing roller 21 was set to $\theta_2=-15°$ and the angle $\theta_3$ of the south pole to $\theta_3=+20°$. The range of said angle $\theta_1$ is desirable to be $0°<\theta_1<45°$, and the range of $10°<\theta_1<40°$, in particular, is the most suitable range. The range of said angle $\theta_2$ is desirable to be $-20°<\theta_2<0°$, and the range of $-15<\theta_2<-10°$, in particular, is the most suitable range. The range of said angle $\theta_3$ is desirable to be $0°\theta_3<90°$, and the range of $10°<\theta_3<50°$, in particular, is the most suitable range.

The composition of the developer used in the present example, i.e., the one component magnetic toner, was 70% wt. of polyester resin, 25% wt. of ferrite, 3% wt. of carbon black, and 2% wt. of oxycarboxylic acid metal complex with 0.4% wt. of colloidal silica added further.

The operation of the electrophotographic apparatus constructed as described above will be explained hereunder with reference to FIG. 9.

The electrostatic latent image holding member 14 was charged to −500 V by means of the corona charger 16 and the grid electrode 17. (The applied voltage was −4 kV and the grid electrode voltage was −500 V.) Then, an electrostatic latent image was formed by irradiation of the laser signal light 18 on said electrostatic latent image holding member 14. At this time, the exposure potential ($V_r$) of the electrostatic latent image holding member 14 was −100 V. Next, the mono-component magnetic toner was attached on the surface of said electrostatic latent image holding member 14 in the developer reservoir 19 by the magnetic force of the magnet 15. At this time, the toner was charged to about −3 μC/g. The electrostatic latent image holding member 14 attached with a toner layer passed the front of the removing roller 21, the surface of which was located at a distance of 300 μm from that of the electrostatic latent image holding member 14.

An AC voltage (1 kHz in frequency) of 750 $V_{o-p}$ superimposed with a DC voltage of −300 V having a waveform as shown in FIG. 5 was applied to the removing roller 21 from the high voltage power source 23. While the toner layer on the electrostatic latent image holding member 14 was traveling by passing between the electrostatic latent image holding member 14 and the removing roller 21, the toner attached on the non-image areas of the electrostatic latent image holding member 14 was gradually removed to the side of the removing roller 21. Only the toner images with a positive-negative picture reversal remained at the image areas of the electrostatic latent image holding member 14.

The toner attached on the removing roller 21 which was rotating in the direction of the arrow in FIG. 9 was formed into a brush-like shape along the magnetic force which was produced by the magnet 22 and disposed in the peripheral direction of the removing roller 21. The toner attached on the removing roller 21 in a brush-like shape was transported by the friction force due to the rotation of the removing roller 21, scraped off by the scraper 24, and returned into the developer reservoir 19.

It was observed at the upper area of the S-pole on the surface of the removing roller 21 that the toner was in a fierce turbulence. The toner images thus formed on the electrostatic latent image holding member 14 were transferred onto paper (not shown in FIG. 9) by means of the transfer corona charger 25. Then, after thermally fixing the images by means of a fixing equipment (not shown in FIG. 9), printed images were obtained. On the other hand, the toner left on the electrostatic latent image holding member 14, after transferring the toner images to paper, was transported by the rotation of the electrostatic latent image holding member 14, and collected by the cleaner 26.

As a result, sharp images of high image density without showing any non-uniformity of density were obtained.

Accordingly, this particular exemplary embodiment of the present invention features a structure comprising a fixed and non-rotary magnet, i.e., a magnetic field generating means, which is installed inside a rotary removing roller, and produces two magnetic poles having polarity opposite to each other on the surface of the removing roller in the vicinity of the development areas where the electrostatic latent image holding member comes closest to the removing roller.

Figure 10:
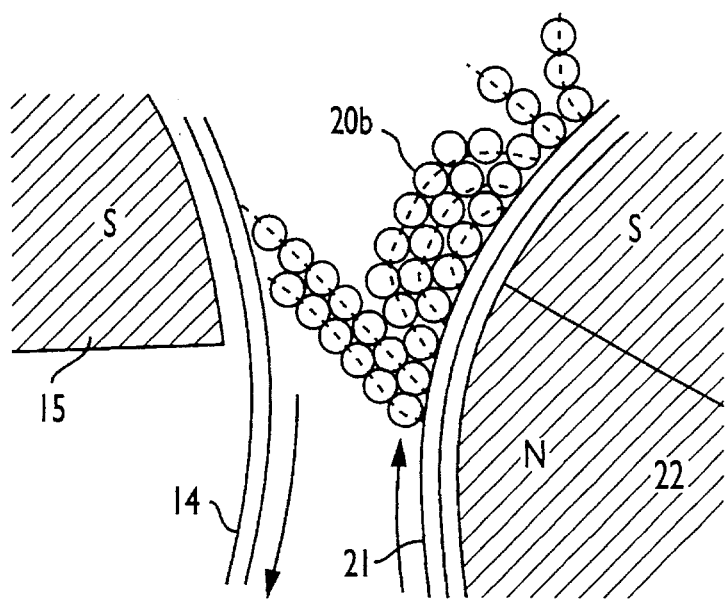
FIG. 10 is an enlarged view of the vicinity of the developing areas shown in FIG. 9 for explaining the effects of the present invention.

The operation of the electrophotographic apparatus of this exemplary embodiment of the invention and features thereof will be explained in a greater detail with reference to FIG. 10. FIG. 10 is an enlarged view showing schematically the vicinity of the development areas of the electrophotographic apparatus illustrated in FIG. 9. As shown in FIG. 10, the toner serving as the developer is aligned in a brush-like shape along the magnetic force lines generated by the magnet 22 in the peripheral direction of the removing roller 21 to form a magnetic brush 20b. Therefore, the transporting force applied to the toner 20 exerted by the removing roller 21 does not only work on the individual particles of the toner, which are forming the first layer of the toner and in direct contact with the surface of the removing roller 21. Instead, the transporting force applied to the toner 20 also works on the entire magnetic brush which is a collection of the toner particles put together by the magnetic force, and therefore the transporting force to carry the toner is remarkably intensified. Besides, the unevenness in transporting force due to the scattering in frictional force among the individual toner particles is also rectified.

As a result, since the low charged toner collected by the removing roller 21 can be removed from the areas vibrated by an AC bias voltage in a forceful and stable manner, excellent picture quality without any background development and non-uniformity of density is obtained even under the conditions of high temperature and high humidity or high speed processing.

EXAMPLE 4

A fourth exemplary embodiment of the present invention for an electrophotographic apparatus will be described with the help of FIG. 13, FIG. 14, and FIG. 15.

Figure 13:
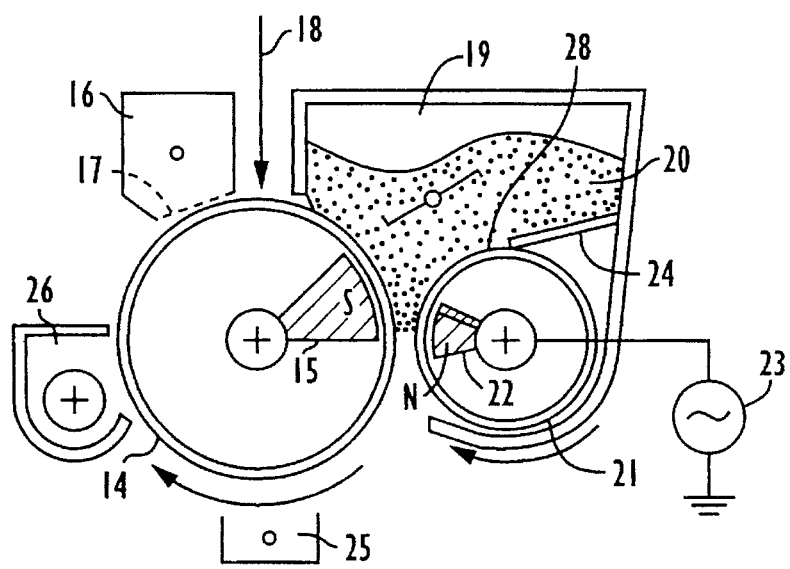
FIG. 13 is a schematic illustration showing the structure of a fourth exemplary embodiment of the present invention of an electrophotographic apparatus.

The present example is a modification of the previous exemplary embodiment, e.g., Example 3, and the structure of this example is illustrated in FIG. 13.

The structure shown in FIG. 13 differs from that of FIG. 9 in the construction of the non-rotary magnet 22. More specifically, the magnet 22 has one magnetic pole, and a non-rotary magnetic plate 28 is mounted on the upper side of the magnet 22.

The magnetic plate 28 may be made from any substance readily magnetized by an external magnetic field, e.g., iron or similar substances. The other parts of FIG. 13 are the same as those in FIG. 9. Therefore, the same explanation as was made regarding the symbols used in FIG. 9 applies to those of FIG. 13, and a separate explanation of the symbols is omitted here.

Figure 14:
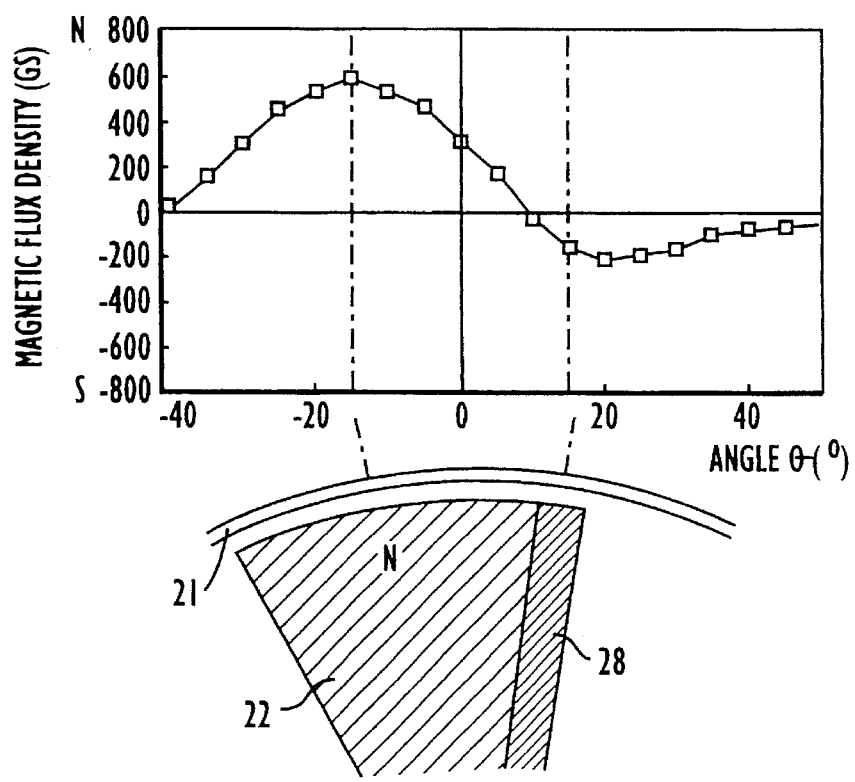
FIG. 14 is a chart of the magnetic flux density distribution observed in the vertical direction on the surface of the removing rollers of the fourth, and sixth exemplary embodiments of the present invention, respectively.
Figure 15:
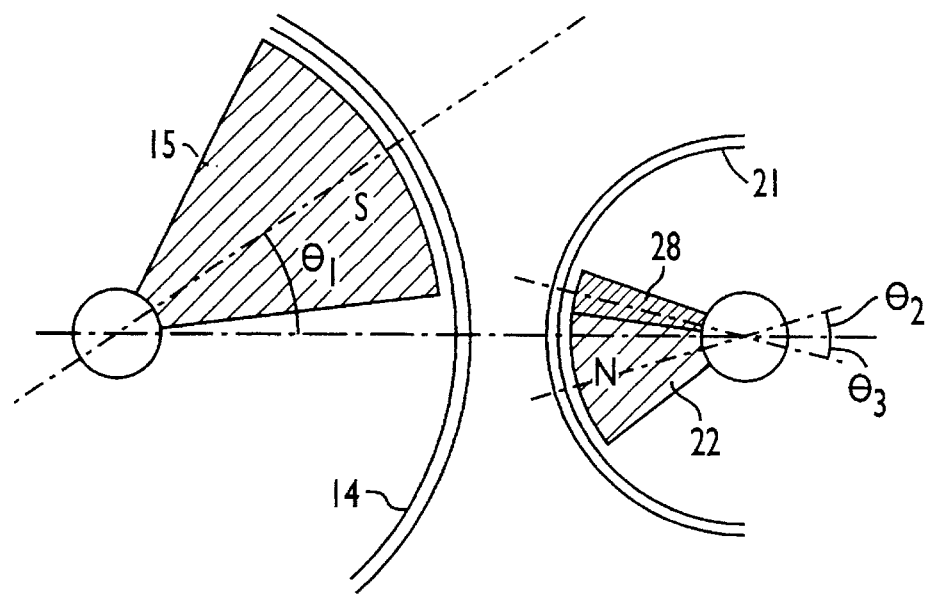
FIG. 15 is a schematic illustration for explaining the arrangement of the magnetic poles formed by magnets as described in a fourth exemplary embodiments of the present invention.

FIG. 14 shows a chart of the magnetic flux density distribution of the magnet 22 and the magnetic plate 28 observed on the surface of the removing roller 21 in the vertical direction. The magnetic plate 28 is magnetized by the magnet 22, and a magnetic pole opposite to the one formed on the surface of the magnet 22 is produced on the surface of the magnetic plate 28. The peak values of the magnetic flux density measure 600 Gs (N-pole), and −200 Gs (magnetic plate), respectively. FIG. 15 shows the positional relation between the magnet 22 inside the removing roller 21 and the magnet 15 inside the electrostatic latent image holding member 14. The angle that the magnet 15 installed inside the electrostatic latent image holding member 14 makes from the point where the surface of the electrostatic latent image holding member 14 comes closest to that of the removing roller 21 was set to $\theta_1=35°$ in the direction opposite to the rotation of the electrostatic latent image holding member 14, while the angle $\theta_2$ of the north pole of the magnet 22 inside the removing roller 21 and the angle $\theta_3$ of the magnetic plate 28 were set to $\theta_2=-15°$ and $\theta_3=+15°$, respectively. The range of said angle $\theta_1$ is desirable to be $0°<\theta_1<45°$, and the range of $10°<\theta_1<40°$, in particular, is the most suitable range. The range of $\theta_2$ is desirable to be $-20°<\theta_2<0°$, and the range of $-15°<\theta_2<-10°$, in particular, is the most suitable range The range of $\theta_3$ is desirable to be $0°<\theta_3<90°$, and the range of $10°<\theta_3<50°$, in particular, is the most suitable range The operation of the electrophotographic apparatus constructed as described above will be explained hereunder with the help of FIG. 13.

The electrostatic latent image holding member 14 was charged to −500 V by means of the corona charger 16 and the grid electrode 17. (The applied voltage was −4 kV and the grid electrode voltage was −500 V.) Then, an electrostatic latent image was formed by irradiation of the laser signal light 18 on said electrostatic latent image holding member 14. At this time, the exposure potential of the electrostatic latent image holding member 14 was −100 V. The mono-component magnetic toner was attached on the surface of said electrostatic latent image holding member 14 in the developer reservoir 19 by the magnetic force of the magnet 15. Next, the electrostatic latent image holding member 14 attached with said toner layer passed the front of the removing roller 21. An AC voltage (1 kHz in frequency) of 750 $V_{O-p}$ superimposed with a DC voltage of −300 V having a waveform as shown in FIG. 5 was applied to the removing roller 21 from the high voltage power source 23. The toner layer on the electrostatic latent image holding member 14 traveled between the electrostatic latent image holding member 14 and the removing roller 21. The toner attached on the non-image areas of the electrostatic latent image holding member 14 was gradually removed to the side of the removing roller 21. Consequently, only the toner images with a positive-negative picture reversal remained at the image areas of the electrostatic latent image holding member 14. The toner attached on the removing roller 21, which was rotating in the direction of the arrow, was formed into a brush-like shape along the magnetic force which was produced by the magnet 22 and the magnetic plate 28 and disposed in the peripheral direction of the removing roller 21. The toner attached on the removing roller 21 in a brush-like shape was transported by the frictional force due to the rotation of the removing roller 21, scraped off by the scraper 24, and returned into the developer reservoir 19.

It was observed in the upper area of the magnetic plate 28 on the surface of the removing roller 21 that the toner was in a fierce turbulence. The toner images thus formed on the electrostatic latent image holding member 14 were transferred onto paper (not shown in FIG. 13) by means of the transfer corona charger 25. Then, after thermally fixing by means of a fixing equipment (not shown in FIG. 13), printed images were obtained. On the other hand, the toner left on the electrostatic latent image holding member 14, after transferring of the images onto paper, was transported by the movement of the electrostatic latent image holding member 14, and collected by the cleaner 26.

As a result, sharp images without showing any background development or non-uniformity of images were obtained.

The operation and features of the electrophotographic apparatus of the present example are substantially the same as above explained in Example 3.

EXAMPLE 5

A fifth exemplary embodiment of an electrophotographic apparatus of the present invention will be described with the help of FIG. 16 and FIG. 17.

Figure 16:
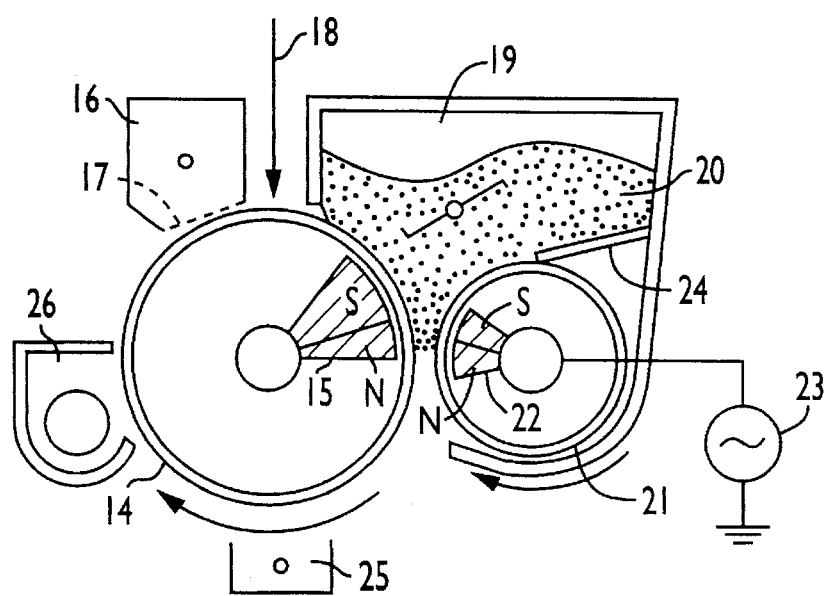
FIG. 16 is a schematic illustration showing the structure of a fifth exemplary embodiment of the present invention of an electrophotographic apparatus.
Figure 17:
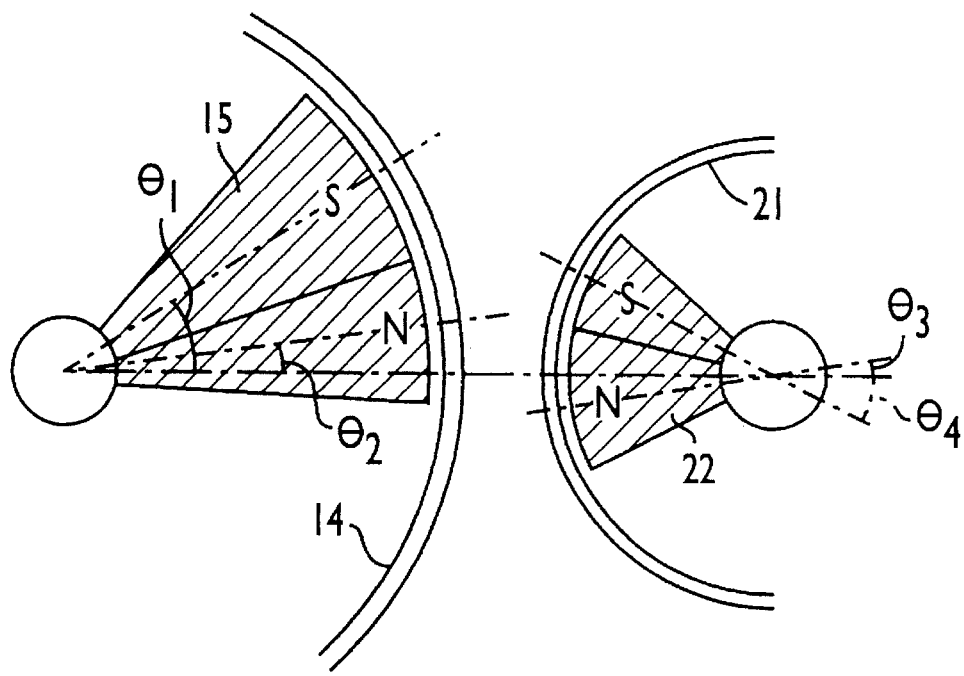
FIG. 17 is a schematic illustration for explaining the arrangement of the magnetic poles formed by magnets as described in a fifth exemplary embodiment of the present invention.

FIG. 16 is a schematic illustration showing the structure of the present example. The structure shown in FIG. 16 differs from that of FIG. 1 in the means employed to produce magnetic fields on the surface of the removing roller.

More specifically, a non-rotary magnet 22 installed inside the removing roller 21 and fixed thereto coaxially has two poles. The magnet 22 can be any suitable magnet, such as a permanent magnet or an electromagnet. FIG. 3 shows a chart of the distribution of the magnetic fluxes produced by a non-rotary magnet 15 and observed on the surface of the electrostatic latent image holding member 14 in the vertical direction. FIG. 11 shows a chart of the distribution of the magnetic fluxes produced by the magnet 22 and observed on the surface of the removing roller 21 in the vertical direction. FIG. 17 shows the positional relation between the magnet 15 inside the electrostatic latent image holding member 14 and the magnet 22 inside the removing roller 21. The angle that the S-pole of the magnet 15 installed inside the electrostatic latent image holding member 14 makes from the point where the surface of the electrostatic latent image holding member 14 comes closest to that of the removing roller 21 was set to $\theta_1 40°$ in the direction opposite to the rotation of the electrostatic latent image holding member 14, while the angle $\theta_2$ of the N-pole of the magnet 15 was set to $\theta_2=10°$. The angle that the N-pole of the magnet 22 installed inside the removing roller 21 makes from the point where the surface of the removing roller comes closest to that of the electrostatic latent image holding member 14 was set to $\theta_3=-15°$ in the direction opposite to the rotation of the removing roller, while the angle $\theta_4$ of the S-pole of the magnet 22 was set to $\theta_4=20°$.

The range of said angle $\theta_1$ is desirable to be $15°<\theta_1<50°$, and the range of $20°<\theta_1<45°$, in particular, is the most suitable range. The range of $\theta_2$ is desirable to be $0°<\theta_2 30°$, and the range of $5°<\theta_2<20°$, in particular, is the most suitable range. The range of $\theta_3$ is desirable to be $-30°<\theta_3<10°$, and the range of $-20°<\theta_3<0°$, in particular, is the most suitable range. The range of $\theta_4$ is desirable to be $0°<\theta_4<30°$, and the range of $5°<\theta_4<25°$, in particular, is the most suitable range.

The operation of the electrophotographic apparatus constructed as described above will be explained hereunder with the help of FIG. 16.

The electrostatic latent image holding member 14 was charged to −500 V by means of the corona charger 16 and the grid electrode 17. (The applied voltage was −4 kV and the grid electrode voltage was −500 V.) Then, an electrostatic latent image was formed by irradiation of the laser signal light 18 on said electrostatic latent image holding member 14. At this time, the exposure potential of the electrostatic latent image holding member 14 was −100 V. Mono-component magnetic toner was attached on the surface of said electrostatic latent image holding member 14 in the developer reservoir 19 by the magnetic force of the magnet 15. Next, the toner attached on the electrostatic latent image holding member 14 was aligned in the peripheral direction of the electrostatic latent image holding member 14 along the magnetic field produced by the magnet 15 to form a magnetic brush, and the brush-like toner was transported by the friction force produced by the rotation of the electrostatic latent image holding member 14. Then, the electrostatic latent image holding member 14 attached with said toner layer passed the front of the removing roller 21. An AC voltage (1 kHz in frequency) of 750 $V_{O-p}$ superimposed with a DC voltage of −300 V having a waveform as shown in FIG. 5 was applied to the removing roller 21 from the high voltage power source 23.

The toner layer on the electrostatic latent image holding member 14 traveled between the electrostatic latent image holding member 14 and the removing roller 21, and the toner attached on the non-image areas of the electrostatic latent image holding member 14 was gradually removed to the side of the removing roller 21. Only the toner images with a positive-negative picture reversal remained at the image areas of the electrostatic latent image holding member 14.

On the other hand, the toner attached on the removing roller 21 was formed into a brush-like shape along the magnetic field produced in the peripheral direction of the removing roller. The toner attached in a brush-like shape was transported by the frictional force due to the rotation of the removing roller 21, scraped off by the scraper 24, and returned into the developer reservoir 19.

Besides, it was observed in the upper area of the magnet 22 on the surface of the removing roller 21 that the toner was in a fierce turbulence. The toner images thus formed on the electrostatic latent image holding member 14 were transferred onto paper (not shown in FIG. 16) by means of the transfer corona charger 25. Then, after thermally fixing by means of a fixing equipment (not shown in FIG. 16), printed images were obtained. On the other hand, the toner left on the electrostatic latent image holding member 14 after transferring of the images to the paper was transported by the movement of the electrostatic latent image holding member 14, and collected by the cleaner 26.

As a result, sharp images of high image density and free of non-uniformity in image density without showing any background development or image hysteresis were obtained.

Accordingly, this example of one embodiment of the invention features a structure comprising a magnetic field generating means installed inside an electrostatic latent image holding member for producing two magnetic poles, having polarity different from each other, on the surface of said electrostatic latent image holding member in the vicinity of developing areas where the electrostatic latent image holding member comes closest to a removing roller. The structure of this embodiment also comprises a magnetic field generating means installed inside the removing roller for producing two magnetic poles, having polarity different from each other, on the surface of the removing roller in the vicinity of the developing areas where the electrostatic latent image holding member comes opposite to the removing roller.

Therefore, because the toner supplied to the electrostatic latent image holding member 14 can be fed abundantly and in a stabilized manner to the development areas and further the toner collected by the removing roller 21 can be removed sufficiently and in a stabilized manner from the area vibrating due to an AC bias voltage, there are produced images of excellent picture quality with a high image density and substantially free of any background development or non-uniformity of density even under the conditions of high temperature, high humidity, and high speed processing.

EXAMPLE 6

A sixth exemplary embodiment of an electrophotographic apparatus of the present invention will be described with the help of FIG. 18 and FIG. 19. This embodiment is a modification of the previous exemplary embodiment, e.g., Example 5, and the structure of this embodiment is illustrated in FIG. 18.

Figure 18:
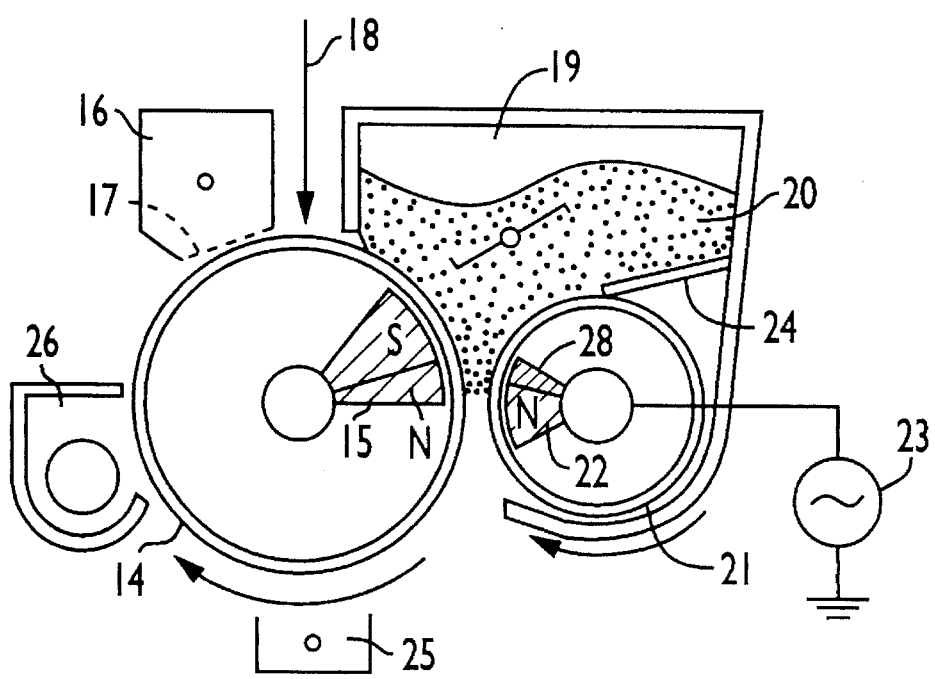
FIG. 18 is a schematic illustration showing the structure of a sixth exemplary embodiment of the present invention of an electrophotographic apparatus.
Figure 19:
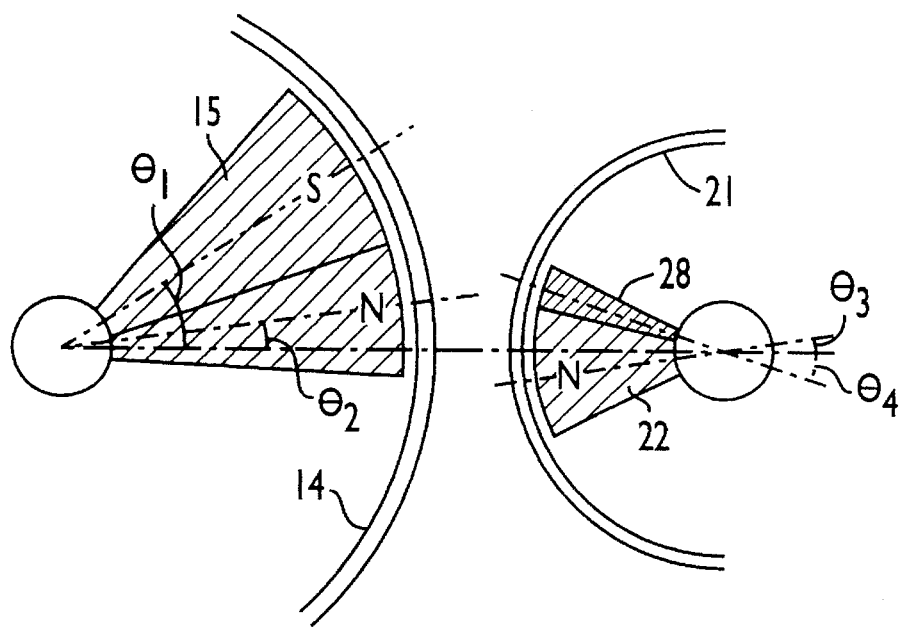
FIG. 19 is a schematic illustration for explaining the arrangement of the magnetic poles formed by magnets as described in the sixth exemplary embodiment of the present invention.

The structure shown in FIG. 18 differs from that of FIG. 1 in the means to produce magnetic field on the surface of the removing roller 21. More specifically, the difference is in having a magnetic plate 28 mounted on the upper side of the non-rotary magnet 22 installed inside the removing roller 21 and fixed thereto coaxially. FIG. 3 shows a chart of the distribution of the magnetic fluxes produced by the non-rotary magnet 15 and observed on the surface of the electrostatic latent image holding member 14 in the vertical direction. FIG. 14 shows a chart of the distribution of the magnetic fluxes produced by the magnet 22 and observed on the surface of the removing roller 21 in the vertical direction. FIG. 19 shows the positional relation between the magnet 15 inside the electrostatic latent image holding member 14 and the magnet 22 inside the removing roller 21. The angle $\theta_1$ that the S-pole of the magnet 15 installed inside the electrostatic latent image holding member 14 makes from the point where the surface of the electrostatic latent image holding member 14 comes closest to that of the removing roller 21 was set to $\theta_1=40°$ in the direction opposite to the rotation of the electrostatic latent image holding member 14, while the angle $\theta_2$ of the N-pole of the magnet 15 was set to $\theta_2=10°$. The angle that the N-pole of the magnet 22 installed inside the removing roller 21 makes from the point where the surface of the removing roller comes closest to that of the electrostatic latent image holding member 14 was set to $\theta_3=-15°$ in the direction opposite to the rotation of the removing roller, while the angle $\theta_4$ of the magnetic plate was set to $\theta_4=15°$.

The range of said angle $\theta_1$ is desirable to be $15°<\theta_1<50°$, and the range of $20°<\theta_1<45°$, in particular, is the most The range of $\theta_2$ is desirable to be $0°<\theta_2<30°$, and the range of $5°<\theta_2<20°$, in particular, is the most suitable range. The range of $\theta_3$ is desirable to be $-30°<\theta_3<10°$, and the range of $-20°<\theta_3<0°$, in particular, is the most suitable range. The range of $\theta_4$ is desirable to be $0°<\theta_4<30°$, and the range of $5°<\theta_4<25°$, in particular, is the most suitable range.

The operation of the electrophotographic apparatus constructed as described above will be explained hereunder with the help of FIG. 18.

The electrostatic latent image holding member 14 was charged to $-500$ V by means of the corona charger 16 and the grid electrode 17. (The applied voltage was $-4$ kV and the grid electrode voltage was $-500$ V.) Then, an electrostatic latent image was formed by irradiation of the laser signal light 18 on said electrostatic latent image holding member 14. At this time, the exposure potential of the electrostatic latent image holding member 14 was $-100$ V. One-component magnetic toner was attached on the surface of said electrostatic latent image holding member 14 in the developer reservoir 19 by the magnetic force of the magnet 15.

Next, the toner attached on the electrostatic latent image holding member 14 was aligned in the peripheral direction of the electrostatic latent image holding member 14 along the magnetic field produced by the magnet 15 to form a magnetic brush (or a "brush-like shaped toner"), and the brush-like shaped toner was transported by the friction force due to the rotation of the electrostatic latent image holding member 14. Then, the electrostatic latent image holding member 14 attached with said toner layer passed the front of the removing roller 21. An AC voltage (1 kHz in frequency) of 750 $V_{o-p}$ superimposed with a DC voltage of $-300$ V having a waveform as shown in FIG. 5 was applied to the removing roller 21 from the high voltage power source 23. The toner layer on the electrostatic latent image holding member 14 traveled between the electrostatic latent image holding member 14 and the removing roller 21, and the toner attached on the non-image areas of the electrostatic latent image holding member 14 was gradually removed to the side of the removing roller 21.

Only the toner images with a positive-negative picture reversal remained at the image areas of the electrostatic latent image holding member 14. The toner attached on the removing roller 21 was formed into a brush-like shape along the magnetic field produced by the magnet 22 inside the removing roller in the peripheral direction of the removing roller. The toner attached in a brush-like shape was transported by the friction force due to the rotation of the removing roller 21, scraped off by the scraper 24, and returned into the developer reservoir 19.

Besides, it was observed in the upper areas of both the S-pole inside the electrostatic latent image holding member 14 and the magnetic plate inside the removing roller 21 that the toner was in a fierce turbulence. The toner images thus formed on the electrostatic latent image holding member 14 were transferred onto paper (not shown in FIG. 18) by means of the transfer corona charger 25. Then, after thermally fixing by means of a fixing equipment (not shown in FIG. 18), printed images were obtained. On the other hand, the toner left on the electrostatic latent image holding member 14, after transferring of the images onto paper, was transported by the rotation of the electrostatic latent image holding member 14, and collected by the cleaner 26.

As a result, sharp images of high image density and substantially free of non-uniformity in density without showing any background development or image hysteresis were obtained.

The operation and features of the electrophotographic apparatus of the present example are substantially the same as described above in Example 5.

EXAMPLE 7

A seventh exemplary embodiment of an electrophotographic apparatus of the present invention will be described with the help of FIG. 20 and FIG. 21.

Figure 20:
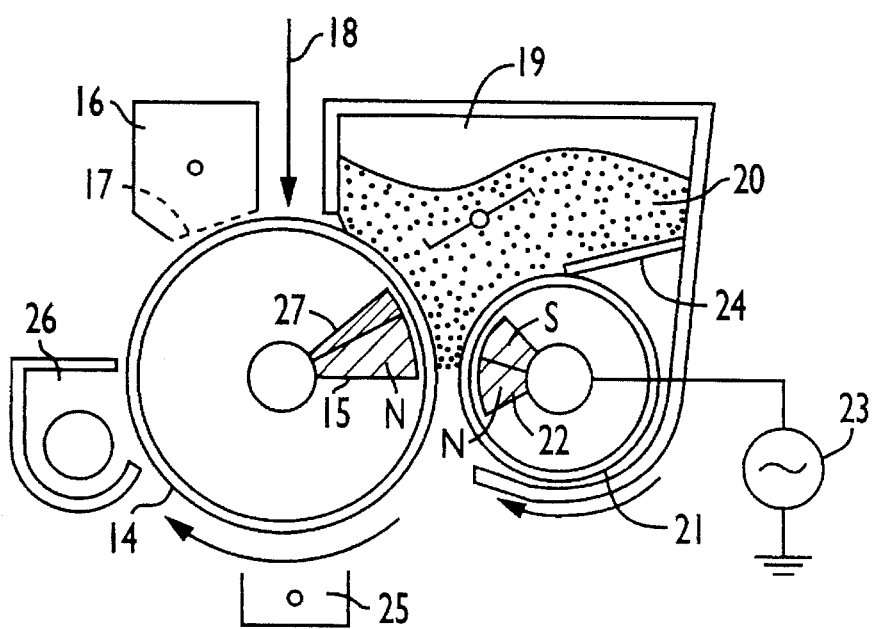
FIG. 20 is a schematic illustration showing the structure of a seventh exemplary embodiment of the present invention of an electrophotographic apparatus.
Figure 21:
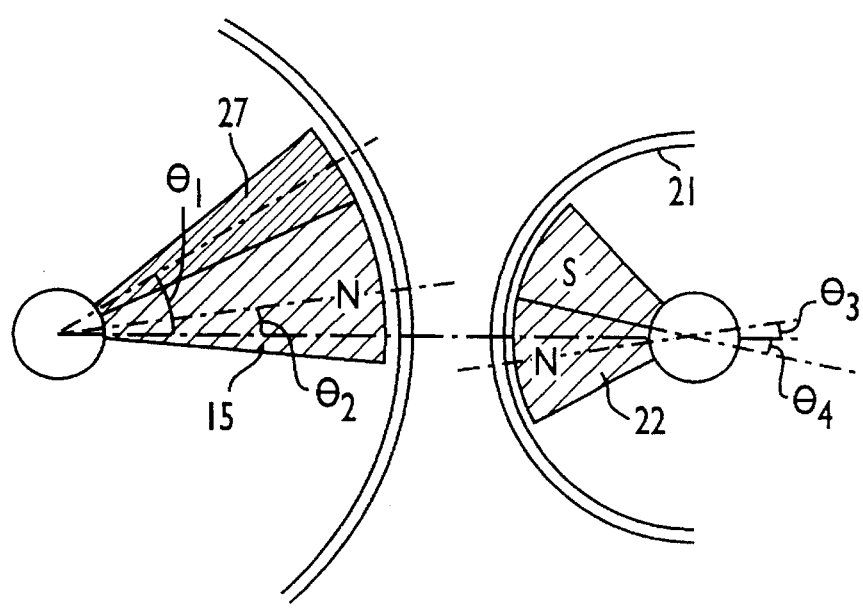
FIG. 21 is a schematic illustration explaining the arrangement of the magnetic poles formed by magnets as described in a seventh exemplary embodiment of the present invention.

This embodiment is a modification of the previous exemplary embodiment, e.g., Example 5, and the structure of this embodiment is illustrated in FIG. 20.

The structure shown in FIG. 20 differs from that of FIG. 6 in the use of a different device to produce magnetic field on the surface of the removing roller 21. More specifically, the difference is in having a non-rotary magnet 22 installed inside the removing roller 21 formed of two magnetic poles.

FIG. 7 shows a chart of the distribution of the magnetic fluxes produced by the magnet 15 and the magnetic plate 27 and observed on the surface of the electrostatic latent image holding member 14 in the vertical direction.

FIG. 11 shows a chart of the distribution of the magnetic fluxes produced by the magnet 22 and observed on the surface of the removing roller 21 in the vertical direction. FIG. 21 shows the positional relation between the magnet 15 inside the electrostatic latent image holding member 14 and the magnet 22 inside the removing roller 21. The angle $\theta_1$ that the magnetic plate 27 installed inside the electrostatic latent image holding member 14 makes from the point where the surface of the electrostatic latent image holding member 14 comes closest to that of the removing roller 21 was set to $\theta_1=40°$ in the direction opposite to the rotation of the electrostatic latent image holding member 14, while the angle $\theta_2$ of the N-pole of the magnet 15 inside the electrostatic latent image holding member 14 was set to $\theta_2=10°$.

The angle $\theta_3$ that the N-pole of the magnet 22 installed inside the removing roller 21 makes the point where the surface of the removing roller comes closest to that of the electrostatic latent image holding member 14 was set to $\theta_3=15°$ in the direction opposite to the rotation of the removing roller, while the angle $\theta_4$ of the S-pole of the magnet 22 was set to $\theta_4=+20°$.

The range of said angle $\theta_1$ is desirable to be $15°<\theta_1<50°$, and the range of $20°<\theta_1<45°$ in particular, is the most suitable range. The range of said angle $\theta_2$ is desirable to be $0°<\theta_2<30°$, and the range of said angle $5°<\theta_2<20°$ in particular, is the most suitable range. The range of said angle $\theta_3$ is desirable to be $-30°<\theta_3<10°$, and the range of $-20°<\theta_3<0°$, in particular, is the most suitable range The range of said angle $\theta_4$ is desirable to be $0°<\theta_4<30°$, and the range of said angle $5°<\theta_4<25°$, in particular, is the most suitable range.

The operation of the electrophotographic apparatus constructed as described above will be explained hereunder with the help of FIG. 20.

The electrostatic latent image holding member 14 was charged to −500 V by means of the corona charger 16 and the grid electrode 17. (The applied voltage was −4 kV and the grid electrode voltage was −500 V.) Then, an electrostatic latent image was formed by irradiation of the laser signal light 18 on said electrostatic latent image holding member 14. At this time, the exposure potential of the electrostatic latent image holding member 14 was −100 V. A mono-component magnetic toner 20 was attached on the surface of said electrostatic latent image holding member 14 in the developer reservoir 19 by the magnetic force of the magnet 15 installed inside the electrostatic latent image holding member 14. Next, the toner attached on the electrostatic latent image holding member 14 was aligned in the peripheral direction along the magnetic field produced by the magnet 15 inside the electrostatic latent image holding member 14 to form a magnetic brush, and the resulting brush-like toner was transported by the friction force produced by the rotation of the electrostatic latent image holding member 14. Then, the electrostatic latent image holding member 14, having said toner layer attached to it, passed the front of the removing roller 21. An AC voltage (1 kHz in frequency) of 750 $V_{o-p}$ superimposed with a DC voltage of −300 V having a waveform as shown in FIG. 5 was applied to the removing roller 21 from the high voltage power source 23. The toner layer on the electrostatic latent image holding member 14 traveled between the electrostatic latent image holding member 14 and the removing roller 21, and the toner attached on the non-image areas of the electrostatic latent image holding member 14 was gradually removed to the side of the removing roller 21. Only the toner images with a positive-negative picture reversal remained at the image areas of the electrostatic latent image holding member 14. The toner attached on the removing roller 21 was formed into a brush-like shape along the magnetic field produced by the magnet 22 inside the removing roller in the peripheral direction of the removing roller. The toner attached in a brush-like shape was transported by the friction force produced by the rotation of the removing roller 21, scraped off by the scraper 24, and returned into the developer reservoir 19. It was also observed in the upper areas of both the magnetic plate 27 inside the electrostatic latent image holding member 14 and the S-pole, inside the removing roller 21, that the toner was in a fierce turbulence. The toner images thus formed on the electrostatic latent image holding member 14 were transferred onto paper (not shown in FIG. 20) by means of the transfer corona charger 25. Then, after thermally fixing by means of a fixing equipment (not shown in FIG. 20), printed images were obtained. As a result, sharp images of high image density and substantially lacking in non-uniformity in density without showing any background development or image hysteresis were obtained. On the other hand, the toner left on the electrostatic latent image holding member 14 after transferring of the toner images onto paper was transported by the rotation of the electrostatic latent image holding member 14, and collected by the cleaner 26.

The operation and features of the electrophotographic apparatus of the present example are substantially the same as explained above in Example 5.

EXAMPLE 8

An electrophotographic apparatus whereby excellent images of high image density without showing any non-uniformity of image density even at a higher printing speed are obtainable will be described as an exemplary eighth embodiment of the present invention with the help of FIG. 22.

Figure 22:
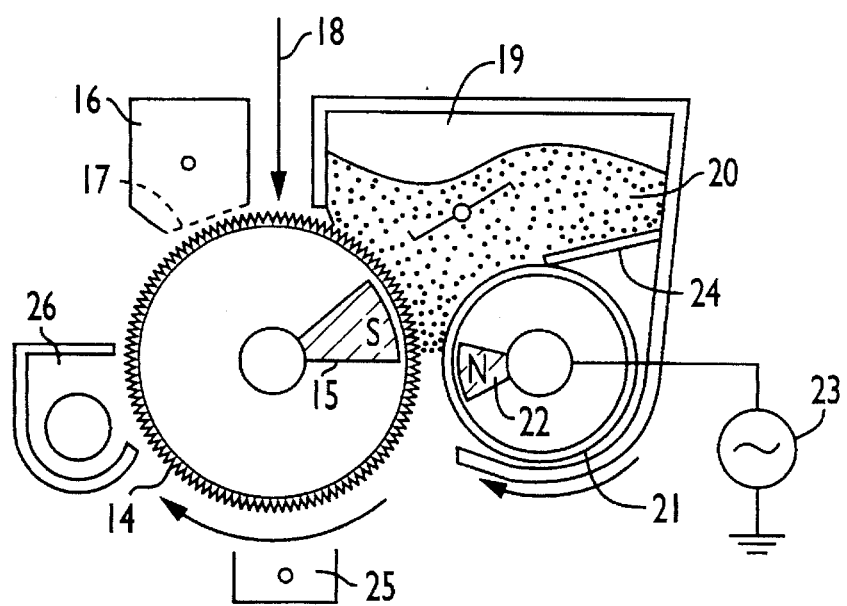
FIG. 22 is a schematic illustration showing the structure of an eighth exemplary embodiment of the present invention of an electrophotographic apparatus.

FIG. 22 shows the structure of an electrophotographic apparatus having a processing speed of 180 mm/s. The structure of FIG. 22 differs from that of FIG. 1 in the number of magnetic poles of the magnet 15 installed inside the electrostatic latent image holding member 14 and the roughness of the surface of the electrostatic latent image holding member 14. More specifically, the number of magnetic poles of the magnet 15 is one, and further the surface of the electrostatic latent image holding member 14 is made rough, e.g., by sand blasting, to have roughness of 0.8 μm with the present example.

Because of said blasting treatment, the friction force between the surface of the electrostatic latent image holding member 14 and the developer, e.g., the toner, has been effectively increased. Other parts of the structure shown in FIG. 22 are the same as those of FIG. 1, and the same explanation made with reference to the symbols of FIG. 1 applies to the ones of FIG. 22.

The operation of the electrophotographic apparatus constructed as described above will be explained hereunder with the help of FIG. 22.

The electrostatic latent image holding member 14 was charged to −500 V by means of the corona charger 16 and the grid electrode 17. (The applied voltage was −6 kV and the grid electrode voltage was −500 V.) Then, an electrostatic latent image was formed by irradiation of the laser signal light 18 on said electrostatic latent image holding member 14. At this time, the exposure potential of the electrostatic latent image holding member 14 was −100 V. Mono-component magnetic toner was attached on the surface of said electrostatic latent image holding member 14 in the developer reservoir 19 by the magnetic force of the magnet 15. The toner attached on the electrostatic latent image holding member 14 was transported without any slipping by the strong friction force working between the toner and the surface of the electrostatic latent image holding member 14. Then, the electrostatic latent image holding member 14, having said toner layer attached thereto, passed the front of the removing roller 21. An AC voltage (1 kHz in frequency) of 750 $V_{o-p}$ superimposed with a DC voltage of −300 V having a waveform as shown in FIG. 5 was applied to the removing roller 21 from the high voltage power source 23. The toner layer on the electrostatic latent image holding member 14 traveled between the electrostatic latent image holding member 14 and the removing roller 21, and the toner attached on the non-image areas of the electrostatic latent image holding member 14 was gradually removed to the side of the removing roller 21. Only the toner images with a positive-negative picture reversal remained at the image areas of the electrostatic latent image holding member 14. The toner attached on the removing roller 21 was transported by the rotation of the removing roller 21 in the direction of the arrow shown in FIG. 22, scraped off by the scraper 24, and returned into the developer reservoir 19. The toner images thus formed on the electrostatic latent image holding member 14 were transferred onto paper (not shown in FIG. 22) by means of the transfer corona charger 25. Then, after thermally fixing by means of a fixing equipment (not shown in FIG. 22), printed images were obtained. On the other hand, the toner left on the electrostatic latent image holding member 14 after transferring of the toner images onto paper was transported by the rotation of the electrostatic latent image holding member 14, and collected by the cleaner 26.

As a result, sharp images of high image density and free of non-uniformity in image density were obtained.

As explained above, the structure of the present example features a means to multiply the friction force between the surface of the electrostatic latent image holding member 14 and the developer.

Accordingly, because of the increased friction force between the electrostatic latent image holding member and the toner, the toner can be transported by the rotation of the electrostatic latent image holding member without any slipping, and the capability of supply and transportation of toner can be greatly enhanced, and further the problem of uneven transportation of toner due to slippage can be eliminated.

Therefore, because the toner supplied to the surface of the electrostatic latent image holding member can be fed to development areas in abundance and in a stabilized manner, excellent image quality of high image density and free of non-uniformity in image density can be realized even under the conditions of high temperature, high humidity, and high speed processing.

Besides, even when the surface roughness of the electrostatic latent image holding member 14 is 0.5, it was possible to gain the same excellent results as described above.

Further, although the surface of the electrostatic latent image holding member 14 was treated by blasting in the present example, it is also possible to gain the same effect by making fine grooves on the surface of the electrostatic latent image holding member 14 or by increasing roughness of that surface by any other suitable method. More specifically, the friction force between the surface of the electrostatic latent image holding member 14 and the toner is increased remarkably by grooving. As a result, the toner supplied is transported without slippage and sharp images of high image density and free of non-uniformity in image density are obtained.

EXAMPLE 9

Next, an electrophotographic apparatus whereby excellent images of high image density without showing any non-uniformity of image density even at a higher printing speed are obtainable will be described as another exemplary embodiment (the ninth embodiment) of the present invention with the help of FIG. 23 and FIG. 24.

Figure 23:
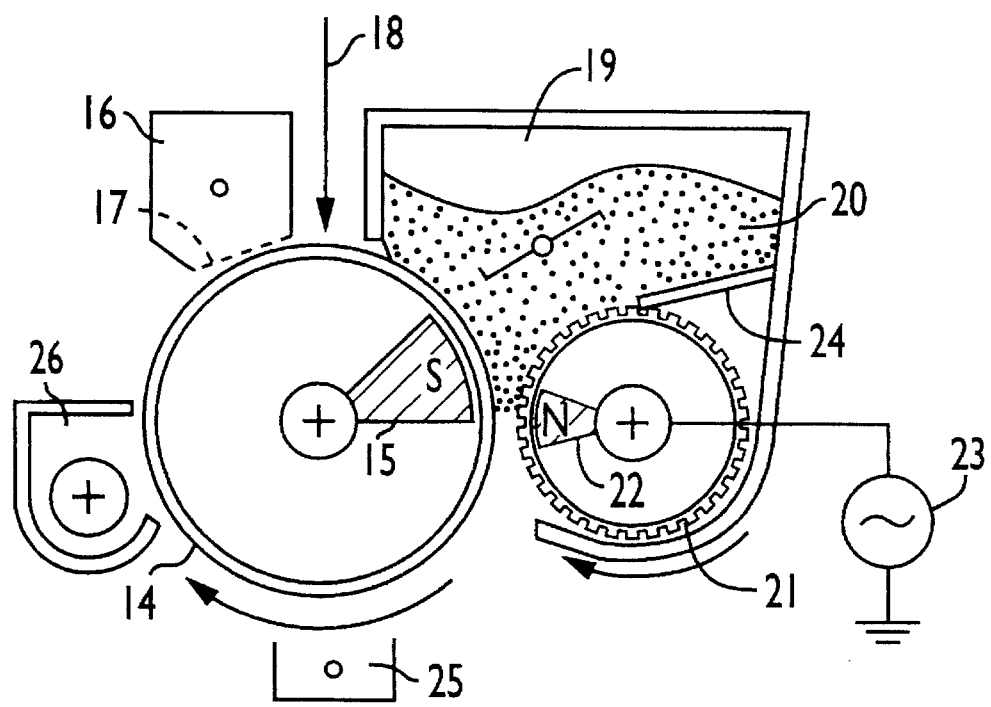
FIG. 23 is a schematic illustration showing the structure of a ninth exemplary embodiment of the present invention of an electrophotographic apparatus.
Figure 24:
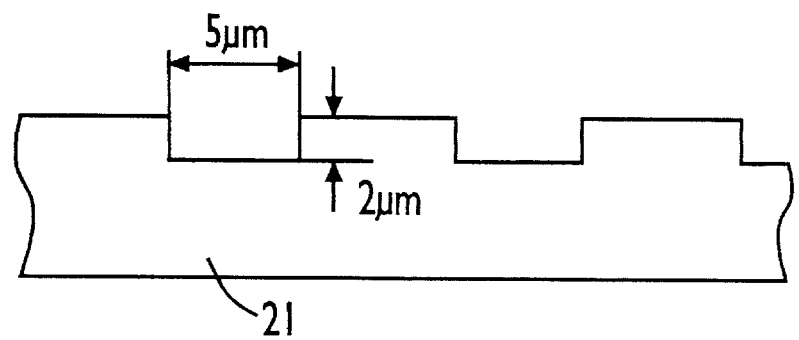
FIG. 24 is an enlarged cross-sectional view of the surface of the removing roller as described in a ninth exemplary embodiment of the present invention.

FIG. 23 shows the structure of an electrophotographic apparatus having a processing speed of 180 mm/s. FIG. 24 is an enlarged cross-sectional view of the rise and fall of the surface of the removing roller 21 which is included in the electrophotographic apparatus shown in FIG. 23. The structure of the apparatus of FIG. 23 differs from that of FIG. 9 in the number of magnetic poles of the magnet 22 installed inside the removing roller 21 and the roughness of the surface of the removing roller 21. More specifically, the number of magnetic poles of the magnet 22 is one and further the surface of the removing roller 21 has fine grooves running in parallel with the axial direction on the surface of the removing roller as shown in FIG. 24.

The operation of the electrophotographic apparatus constructed as described above will be explained hereunder with the help of FIG. 23.

The electrostatic latent image holding member 14 was charged to −500 V by means of the corona charger 16 and the grid electrode 17. (The applied voltage was −6 kV and the grid electrode voltage was −500 V.) Then, an electrostatic latent image was formed by irradiation of the laser signal light 18 on said electrostatic latent image holding member 14. At this time, the exposure potential of the electrostatic latent image holding member 14 was −100 V. Mono-component magnetic toner was attached on the surface of said electrostatic latent image holding member 14 in the developer reservoir 19 by the magnetic force of the magnet 15. Then, the electrostatic latent image holding member 14, having said toner layer attached thereto, passed the front of the removing roller 21. An AC voltage (1 kHz in frequency) of 750 $V_{o-p}$ superimposed with a DC voltage of −300 V having a waveform as shown in FIG. 5 was applied to the removing roller 21 from the high voltage power source 23. The toner layer on the electrostatic latent image holding member 14 traveled between the electrostatic latent image holding member 14 and the removing roller 21, and the toner attached on the non-image areas of the electrostatic latent image holding member 14 was gradually removed to the side of the removing roller 21. Only the toner images with a positive-negative picture reversal remained at the image areas of the electrostatic latent image holding member 14. The toner attached on the removing roller 21 was transported by the rotation of the removing roller 21 in the direction of the arrow, shown in FIG. 23, without slippage because of the strong friction force caused by the grooves made on the surface of the removing roller 21, scraped off by the scraper 24, and returned into the developer reservoir 19. The toner images thus formed on the electrostatic latent image holding member 14 were transferred onto paper (not shown in FIG. 23) by means of the transfer corona charger 25. Then, after thermally fixing by means of a fixing equipment (not shown in FIG. 23), printed images were obtained. On the other hand, the toner left on the electrostatic latent image holding member 14, after transferring of the images onto paper, was transported by the rotation of the electrostatic latent image holding member 14, and collected by the cleaner 26. As a result, sharp images of high image density and free of non-uniformity in image density were obtained.

As explained in the foregoing, the structure of the present example features a means to multiply the friction force between the surface of the electrostatic latent image holding member 14 and the toner, i.e., the developer.

Accordingly, because of the increased friction force of the removing roller against the toner, the toner can be transported by the rotation of the removing roller without any slipping, and the collection capability of the toner can be greatly enhanced, and further the problem of uneven transportation of toner due to slippage can be solved. Therefore, because the slightly charged toner collected by the removing roller can be removed from the areas vibrated by an AC bias voltage sufficiently and in a stabilized manner, excellent image quality of high image density and free of non-uniformity in image density can be realized even under the conditions of high temperature, high humidity and high speed processing.

Besides, it is possible to make the roughness of the surface of the removing roller 21 more than 0.5 μm by blasting or to have the surface of the removing roller 21 lined with a conductive layer of resin mulled together with carbon to remarkably increase the friction force between the surface of the removing roller 21 and the toner. As a result, the toner collected is transported without slippage, and sharp images free of background development and non-uniformity in image density are obtained.

EXAMPLE 10

Next, an electrophotographic apparatus whereby excellent images of high image density without showing any non-uniformity of image density even at a higher printing speed are obtainable will be described as another exemplary embodiment (the tenth embodiment) of the present invention with the help of FIG. 25.

Figure 25:
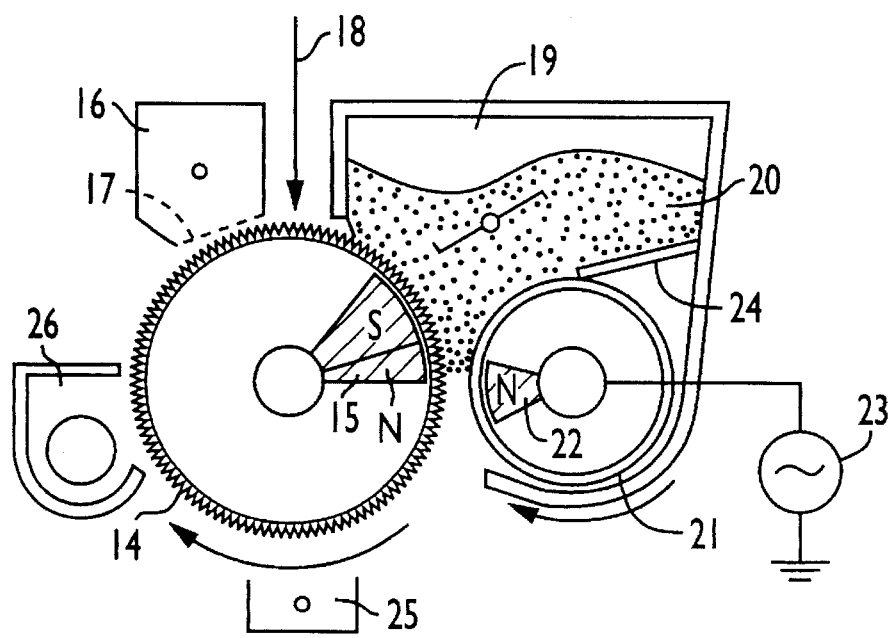
FIG. 25 is a schematic illustration showing the structure of a tenth exemplary embodiment of the present invention of an electrophotographic apparatus.

FIG. 25 shows the structure of an electrophotographic apparatus having a processing speed of 180 mm/s. The structure of the apparatus of FIG. 25 differs from that of FIG. 1 in the roughness of the surface of the electrostatic latent image holding member 14. More specifically, the surface of the electrostatic latent image holding member 14 is treated by blasting to have roughness of 0.5 μm. Because of said blasting treatment, the friction force between the surface of the electrostatic latent image holding member 14 and the developer, e.g., the toner, is effectively increased.

Other parts of the structure shown in FIG. 25 are the same as those of FIG. 1, and the same explanation as made regarding the symbols of FIG. 1 applies to those of FIG. 25.

The structure of the present example comprises a magnetic field generating means installed inside the electrostatic latent image holding member 14 for producing two magnetic poles, and a means for increasing the friction force between the surface of the electrostatic latent image holding member 14 and the developer disposed on the electrostatic latent image holding member.

Accordingly, because the toner attached on the electrostatic latent image holding member can be transported sufficiently to the developing areas by magnetic force and the toner can be transported by the rotation of the electrostatic latent image holding member without any slipping due to the increased friction force between the electrostatic latent image holding member and the toner, the capability of supply and transportation of toner can be greatly enhanced, and further the problem of uneven transportation of toner due to slippage can be solved.

Therefore, because the toner supplied to the surface of the electrostatic latent image holding member can be fed to developing areas in abundance and in a stabilized manner, excellent image quality of high image density and free of non-uniformity in image density can be realized even under the conditions of high temperature, high humidity, and high speed processing.

EXAMPLE 11

Next, an electrophotographic apparatus whereby excellent images of high image density without showing any non-uniformity of image density even at a higher printing speed are obtainable will be described as still another exemplary embodiment (the eleventh embodiment) of the present invention with the help of FIG. 26.

Figure 26:
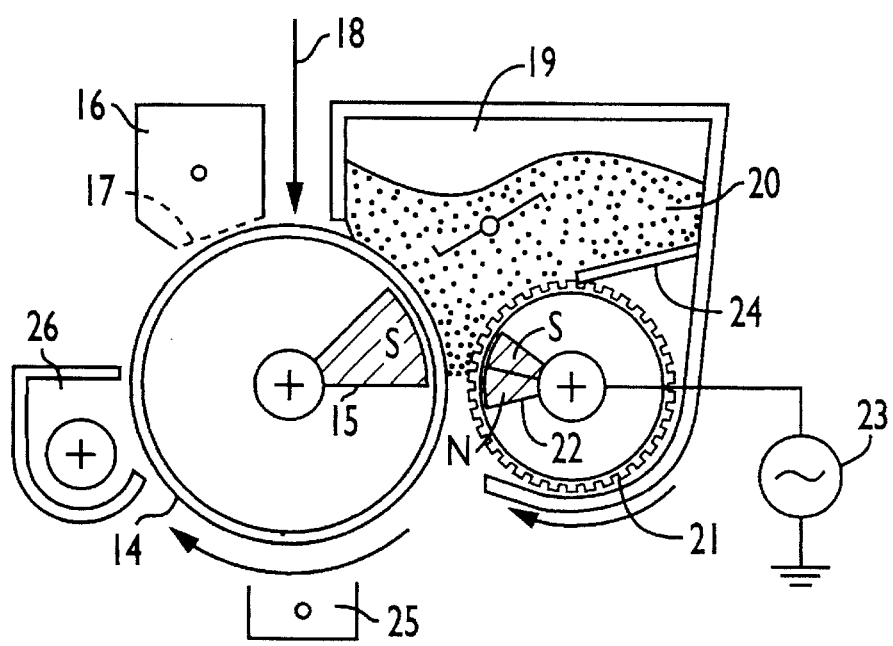
FIG. 26 is a schematic illustration showing the structure of an eleventh exemplary embodiment of the present invention of an electrophotographic apparatus.

FIG. 26 shows the structure of an electrophotographic apparatus having a processing speed of 180 mm/s. The structure of the apparatus of FIG. 26 differs from that of FIG. 9 in the roughness of the surface of the removing roller 21. More specifically, the surface of the removing roller 21 is treated by sand blasting to provide that surface the roughness of 0.5 μm. Aside from this modification, the structure and operation of this embodiment is substantially the same as that of the embodiment of FIG. 9.

The structure of the apparatus of the present example comprises a magnetic field generating means installed inside the removing roller for producing two magnetic poles, and a means for increasing the friction force between the surface of the removing roller and the toner, i.e., the developer, disposed on the removing roller.

Accordingly, the toner collected to the removing roller can be removed sufficiently from the developing areas by magnetic force and further the capability of toner collection can be greatly enhanced because the friction force between the removing roller and the toner is increased and the toner is transported by the rotation of the removing roller without slippage, and still further the problem of uneven transportation of the toner due to slippage can be solved. Therefore, because the slightly charged toner collected by the removing roller can be removed from the areas vibrated by an AC bias voltage, the toner can be removed sufficiently and in a stabilized manner. Additionally, excellent image quality of high image density and free of non-uniformity in image density can be realized even under the conditions of high temperature, high humidity, and high speed processing.

EXAMPLE 12

Next, an electrophotographic apparatus whereby excellent images of high image density without showing any non-uniformity of image density even at a higher printing speed are obtainable will be described as still another exemplary embodiment (the twelfth embodiment) of the present invention with the help of FIG. 27.

Figure 27:
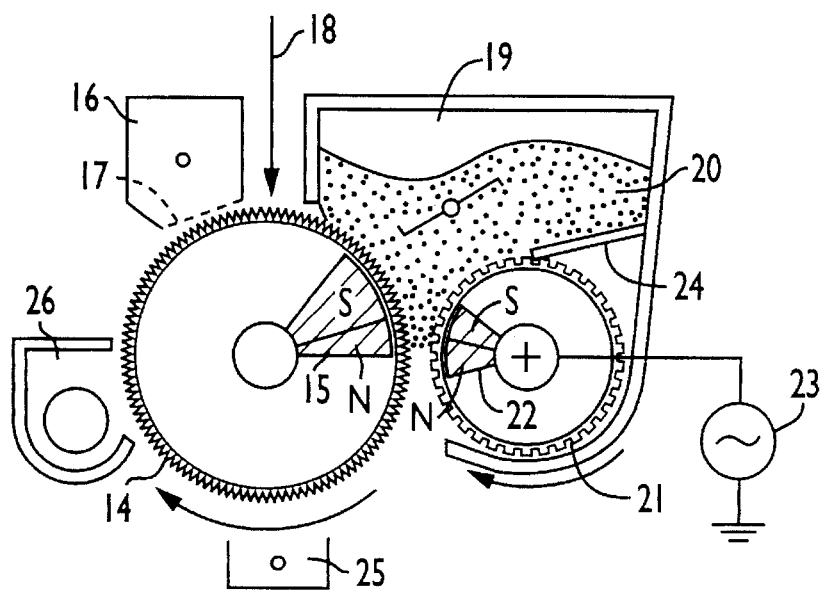
FIG. 27 is a schematic illustration showing the structure of a twelfth exemplary embodiment of the present invention of an electrophotographic apparatus.
Figure 28:
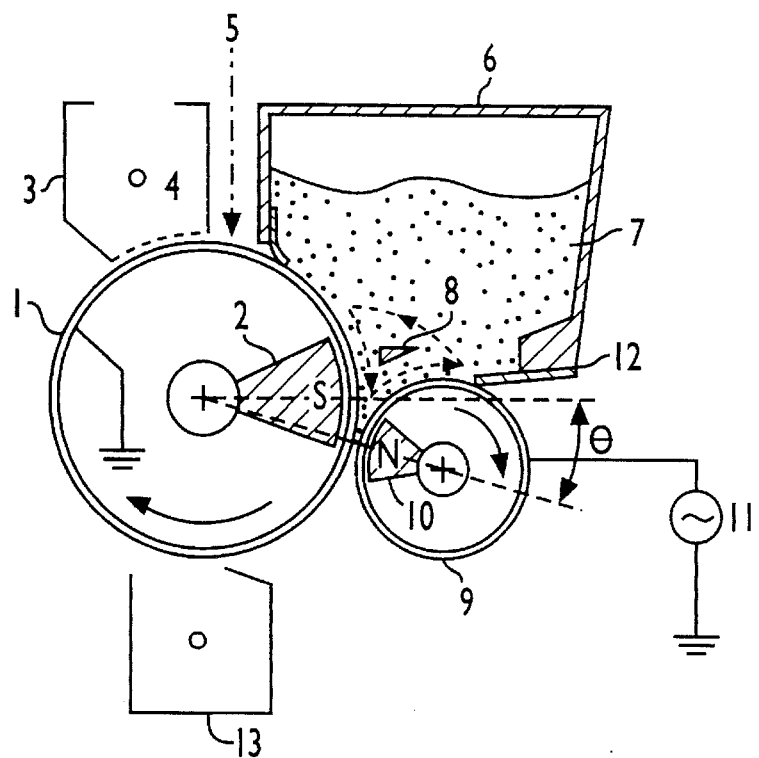
FIG. 28 is a schematic illustration showing the structure of a prior art electrophotographic apparatus.

FIG. 27 shows the structure of an electrophotographic apparatus having a processing speed of 180 mm/s. The structure of the apparatus of FIG. 27 differs from that of FIG. 16 in the roughness of the surfaces of the electrostatic latent image holding member 14 and the removing roller 21. More specifically, the surfaces of the electrostatic latent image holding member 14 and the removing roller 21 are treated by blasting to have roughness of 0.5 μm, respectively.

The structure of the apparatus of the present example comprises a magnetic field generating means for producing two magnetic poles of polarity different from each other on the surface of the electrostatic latent image holding member, a means for increasing the friction force of the surface of the electrostatic latent image holding member, a magnetic field generating means installed inside the removing roller 21 for producing two magnetic poles, and a means for increasing the friction force between the surface of the removing roller and the developer, e.g., the developer disposed on the removing roller.

Accordingly, because the toner attached on the electrostatic latent image holding member can be transported sufficiently to the developing areas by magnetic force and the toner can be transported by the rotation of the electrostatic latent image holding member without any slipping because of the increased friction force between the electrostatic latent image holding member and the toner, the capability of supply and transportation of toner can be greatly enhanced.

Further, the capability of toner collection can be greatly enhanced because the friction force between the removing roller and the toner is increased and the toner is transported by the rotation of the removing roller without slipping, and the problem of uneven transportation of toner due to slippage can also be solved.

Therefore, because the toner supplied to the surface of the electrostatic latent image holding member can be fed to developing areas in abundance and in a stabilized manner, the slightly charged toner collected by the removing roller can be removed from the areas vibrated by an AC bias voltage sufficiently and in a stabilized manner, excellent image quality free of background development and non-uniformity in image density can be realized even under the conditions of high temperature, high humidity, and high speed processing.

The embodiments described above are merely exemplary in nature and should not be considered to limit the scope of the invention, which is directed to any and all possible modifications falling within the spirit and scope of the invention described and claimed herein.

For example, the invention encompasses an electrophotographic apparatus appropriately combining such a variety of means as producing magnetic field from two magnetic poles having polarity different from each other on the surface of an electrostatic latent image holding member, increasing the friction force of the surface of said electrostatic latent image holding member, producing two magnetic poles having polarity different from each other on the surface of a removing roller, increasing the friction force of the surface of the removing roller, and any other suitable combination of features described above.

The embodiments described above provide a number of significant advantages. Since the magnetic force, generated by the magnetic field generating means having two opposing magnetic poles, in the electrostatic latent image holding member 14 and/or the removing roller 21, forces the toner to align in a brush-like shape (also referred to herein as a "magnetic brush"), the transporting force is applied to the entire brush-like shape, which substantially intensifies the transporting force. Additionally, the unevenness in the transporting force, due to non-uniformity of frictional forces among the individual toner particles is substantially eliminated. The provision of a means for increasing the friction force against the developer on the electrostatic image holding member 14 and/or the removing roller 21 intensifies these advantages. All of these improvements contribute to the production of improved images having relatively high resolution which are substantially free of non-uniformity in image density.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

What is claimed is:

1. An electrophotographic apparatus comprising
   a magnetic developer,
   an electrostatic latent image holding member rotating in a specified direction, a removing roller which is placed at a position with a specified distance apart from a surface of said electrostatic latent image holding member and which rotates in a direction opposite to the rotation of said electrostatic latent image holding member, a developer reservoir for supplying said magnetic developer to the surface of said electrostatic latent image holding member, a means for applying an AC voltage to said removing roller to remove the magnetic developer retained on non-image areas of said electrostatic latent image holding member, a magnetic field generating means installed inside said electrostatic latent image holding member for producing two magnetic poles having polarity different from each other on the surface of said electrostatic latent image holding member in a vicinity of developing areas where said electrostatic latent image holding member comes closest to said removing roller, and a magnetic field generating means installed inside said removing roller for producing one magnetic pole on a surface of said removing roller at the vicinity of developing areas where said electrostatic latent image holding member comes closest to said removing roller, wherein one of the magnetic poles installed inside the electrostatic latent image holding member, which is located at the downstream side of the direction of rotation of the electrostatic latent image holding member, and which has a given polarity, comes opposite to a magnetic pole installed inside the removing roller, which also has given polarity, at the vicinity of developing areas where said electrostatic latent image holding member comes closest to said removing roller.

2. The electrophotographic apparatus according to claim 1, wherein the magnetic field generating means placed inside the electrostatic latent image holding member for producing two magnetic poles comprises a magnet, and the magnetic field generating means placed inside the removing roller for producing one magnetic pole comprises a magnet.

3. The electrophotographic apparatus according to claim 1, where in the magnetic field generating means placed inside the electrostatic latent image holding member for producing two magnetic poles comprises a magnet and a substance which can be magnetized by a magnetic field for the other magnetic pole, said magnet is located at the downstream side of the direction of rotation of the electrostatic latent image holding member, said substance is located at the upstream side of the direction of rotation of the electrostatic latent image holding member.

4. The electrophotographic apparatus according to claim 1, wherein the surface of the electrostatic latent image holding member is provided with a means of increasing friction force against the developer.

5. An electrophotographic apparatus comprising a magnetic developer, an electrostatic latent image holding member rotating in a specified direction, a removing roller which is placed at a position with a specified distance apart from a surface of said electrostatic latent image holding member and which rotates in a direction opposite to the rotation of said electrostatic latent image holding member, a developer reservoir for supplying said magnetic developer to the surface of said electrostatic latent image holding member, a means for applying an AC voltage to said removing roller to remove the magnetic developer retained on non-image areas of said electrostatic latent image holding member, a magnetic field generating means installed inside said electrostatic latent image holding member for producing two magnetic poles having polarity different from each other on the surface of said electrostatic latent image holding member in a vicinity of developing areas where said electrostatic latent image holding member comes closest to said removing roller, and a magnetic field generating means installed inside said removing roller for producing two magnetic poles having polarity different from each other on a surface of said removing roller in the vicinity of developing areas where said electrostatic latent image holding member comes closest to said removing roller, wherein one of the two magnetic poles installed inside the electrostatic latent image holding member, which is located at the downstream side of the direction of rotation of the electrostatic latent image holding member, and which has a given polarity, comes opposite to one of the two magnetic poles installed inside the removing roller, which also has said given polarity, and which is located at the upstream side of the rotation of the removing roller, at the vicinity of areas where said electrostatic latent image holding member comes closest to said removing roller.

6. The electrophotographic apparatus according to claim 5, wherein the magnetic field generating means installed inside the electrostatic latent image holding member for producing two magnetic poles comprises a magnet for one magnetic pole and a substance which can be magnetized by a magnetic field for the other magnetic pole, said magnet is located at the downstream side of the direction of rotation of the electrostatic latent image holding member, said substance is located at the upstream side of the direction of rotation of the electrostatic latent image holding member.

7. The electrophotographic apparatus according to claim 5, wherein the magnetic field generating means installed inside the removing roller for producing two magnetic poles is formed of a magnet for one magnetic pole and a substance which can be magnetized by a magnetic field for the other magnetic field, said magnet is located at the upstream side of the direction of rotation of the removing roller, said substance is located at the downstream side of the direction of rotation of the removing roller.

8. The electrophotographic apparatus according to claim 5, wherein the surface of the electrostatic latent image holding member is provided with a means of increasing friction force against the developer, and the surface of the removing roller is provided with a means of increasing friction force against the developer.

9. The electrophotographic apparatus according to claim 5, wherein one of the two magnetic poles installed inside the electrostatic latent image holding member, which is located at the downstream side of the direction of rotation of the electrostatic latent image holding member, and which is located at the direction of range −30° to +30° in angle from the vicinity of areas where said electrostatic latent image holding member comes closest to said removing roller, one of the two magnetic poles installed inside the removing roller, which is located at the upstream side of the direction of rotation of the removing roller, and which is located at the direction of range −30° to +30° in angle from the vicinity of areas where said electrostatic latent image holding member comes closest to said removing roller.

10. The electrophotographic apparatus according to claim 5, wherein a magnetic flux between the magnetic poles installed inside the electrostatic latent image holding member and the magnetic poles installed inside the removing roller does not exist at the vicinity of developing areas where said electrostatic latent image holding member comes closest to said removing roller.

11. An electrophotographic apparatus comprising a magnetic developer, an electrostatic latent image holding member rotating in a specified direction, a surface of said electrostatic latent image holding member comprising a means for increasing friction force against said developer, a removing roller which is placed at a position with a specified distance apart from the surface of said electrostatic latent image holding member and rotates in a direction opposite to the rotation of said electrostatic latent image holding member, a developer reservoir for supplying said magnetic developer to the surface of said electrostatic latent image holding member, a means for applying an AC voltage to said removing roller to remove the developer retained on non-image areas of said electrostatic latent image holding member, and a magnetic field generating means installed inside said electrostatic latent image holding member for producing a magnetic field on the surface of said electrostatic latent image holding member in a vicinity of developing areas where said electrostatic latent image holding member comes closest to said removing roller.

12. The electrophotographic apparatus according to claim 11, wherein the means for increasing friction force of the surface of the electrostatic latent image holding member comprises fine grooves placed on the surface of the electrostatic latent image holding member.

13. The electrophotographic apparatus according to claim 11, wherein the means for increasing friction force of the surface of the electrostatic latent image holding member comprises roughness on the surface of the electrostatic latent image holding member, so that the roughness of the surface is at least 0.5 µm.

14. An electrophotographic apparatus comprising a magnetic developer, an electrostatic latent image holding member rotating in a specified direction, a removing roller comprising a means for increasing friction force against said developer, said removing roller placed at a position with a specified distance apart from a surface of said electrostatic latent image holding member and rotating in a direction opposite to the rotation of said electrostatic latent image holding member, a developer reservoir for supplying said magnetic developer to the surface of said electrostatic latent image holding member, a means for applying an AC voltage to said removing roller to remove the developer retained on non-image areas of said electrostatic latent image holding member, and a magnetic field generating means installed inside said electrostatic latent image holding member for producing a magnetic field on the surface of said electrostatic latent image holding member in a vicinity of developing areas where said electrostatic latent image holding member comes closest to said removing roller wherein said removing roller removes said developer retained on said non-image areas of said electrostatic latent image holding member at the vicinity of developing areas where said electrostatic latent image holding member comes closest to said removing roller without slippage because of the friction force caused by said means for increasing friction force.

15. The electrophotographic apparatus according to claim 14, wherein the means for increasing friction force of a surface of the removing roller comprises fine grooves places on the surface of the removing roller.

16. The electrophotographic apparatus according to claim 14, wherein the means for increasing friction force of the surface of the removing roller comprises roughness on the surface of the removing roller so that roughness thereof is at least 0.5 µm.

17. A method for forming an image by an electrophotographic apparatus comprising:

(a) forming an electrostatic latent image on a surface of an electrostatic latent image holding member;

(b) applying a magnetic developer to the surface of the electrostatic latent image holding member, thereby applying the magnetic developer to image and non-image areas of the surface of the electrostatic latent image holding member;

(c) attaching the magnetic developer to the surface of the electrostatic latent image holding member by a first magnetic field generating means installed inside the electrostatic latent image holding member, said magnetic field generating means producing two magnetic poles, having polarity different from each other, on the surface of the electrostatic latent image holding member;

(d) passing a removing roller, comprising a second magnetic field generating means installed therein, to remove the magnetic developer from the non-image areas of the electrostatic latent image holding member, said second magnetic field generating means produces a magnetic pole, having a given polarity, on a surface of the removing roller; and (e) transferring onto paper the magnetic developer from the image areas, wherein one of the magnetic poles installed inside the electrostatic latent image holding member, which is located at the downstream side of the direction of rotation of the electrostatic latent image holding member, and which has a given polarity, comes opposite to a magnetic pole installed inside the removing roller, which has said given polarity, at a vicinity of area where said electrostatic latent image holding member comes closest to said removing roller.

* * * * *